United States Patent
Pearson et al.

(10) Patent No.: US 8,364,287 B2
(45) Date of Patent: Jan. 29, 2013

(54) APPARATUS, SYSTEM, AND METHOD TO MANAGE THE GENERATION AND USE OF HYBRID ELECTRIC POWER

(75) Inventors: Ken Pearson, Shingle Springs, CA (US); Chris Brydon, Salt Lake City, UT (US); Eugene You, Salt Lake City, UT (US); Guangde Wang, Salt Lake City, UT (US)

(73) Assignee: Trulite, Inc., Houston, TX (US)

( * ) Notice: Subject to any disclaimer, the term of this patent is extended or adjusted under 35 U.S.C. 154(b) by 226 days.

(21) Appl. No.: 12/179,882

(22) Filed: Jul. 25, 2008

(65) Prior Publication Data
US 2009/0076661 A1 Mar. 19, 2009

Related U.S. Application Data

(60) Provisional application No. 60/951,925, filed on Jul. 25, 2007.

(51) Int. Cl.
*H01M 8/18* (2006.01)
*H02J 3/46* (2006.01)
*H02J 3/32* (2006.01)

(52) U.S. Cl. ............ 700/11; 700/22; 700/286; 700/297; 429/502; 320/101; 48/61; 422/119

(58) Field of Classification Search ............ 700/11, 700/22, 286, 297
See application file for complete search history.

(56) References Cited

U.S. PATENT DOCUMENTS

| | | | |
|---|---|---|---|
| 2,542,746 | A | 2/1951 | Banus et al. |
| 2,935,382 | A | 5/1960 | Osborn et al. |
| 3,113,832 | A | 12/1963 | Kollonitsch et al. |
| 3,133,837 | A | 5/1964 | Eidensohn |
| 3,313,598 | A | 4/1967 | Gluckstein |
| 3,449,078 | A | 6/1969 | Quik et al. |
| 3,511,710 | A | 5/1970 | Jung et al. |
| 3,649,360 | A | 3/1972 | Bloomfield et al. |
| 3,734,863 | A | 5/1973 | Beckert et al. |
| 3,940,474 | A | 2/1976 | Huskins et al. |
| 3,977,990 | A | 8/1976 | Beckert et al. |
| 3,985,865 | A | 10/1976 | Hohne |
| 4,000,003 | A | 12/1976 | Baker et al. |
| 4,081,345 | A | 3/1978 | Tolg et al. |

(Continued)

FOREIGN PATENT DOCUMENTS

| | | |
|---|---|---|
| EP | 1424760 | 6/2004 |
| EP | 1514839 | 3/2005 |

(Continued)

OTHER PUBLICATIONS

Electrochem inc, http://fuelcell.com/primer.aspx, FUel Cell primer, 2006, pp. 1-2.*

(Continued)

*Primary Examiner* — Sean Shechtman
*Assistant Examiner* — Olvin Lopez
(74) *Attorney, Agent, or Firm* — Kunzler Law Group, PC

(57) ABSTRACT

An apparatus, system, and method are disclosed to manage the generation and use of hybrid electric power. A monitoring module receives signals from one or more sensors. The signals comprise power level information of an electric energy storage device, power level information of one or more energy converters, and power level information of an electric load. A determination module compares the signals to determine whether electric power from the energy converters satisfies the electric load. A regulation module adjusts the electric power from the energy converters in response to a determination by the determination module that the electric power from the energy converters does not satisfy an electric load threshold.

21 Claims, 4 Drawing Sheets

U.S. PATENT DOCUMENTS

| | | | |
|---|---|---|---|
| 4,124,116 A | 11/1978 | McCabe, Jr. | |
| 4,155,712 A | 5/1979 | Taschek | |
| 4,261,955 A | 4/1981 | Bailey, Jr. et al. | |
| 4,261,956 A | 4/1981 | Adlhart | |
| 4,433,633 A | 2/1984 | Caudy et al. | |
| 4,436,793 A | 3/1984 | Adlhart | |
| 4,463,063 A | 7/1984 | Adlhart | |
| 4,463,066 A | 7/1984 | Adlhart et al. | |
| 4,463,068 A | 7/1984 | Cohn et al. | |
| 4,486,276 A | 12/1984 | Cohn et al. | |
| 4,513,065 A | 4/1985 | Adlhart | |
| 4,543,246 A | 9/1985 | Houser | |
| 4,628,010 A | 12/1986 | Iwanciow | |
| 4,709,202 A | 11/1987 | Koenck | |
| 4,740,504 A | 4/1988 | Hall et al. | |
| 4,782,096 A | 11/1988 | Banquy | |
| 4,845,419 A | 7/1989 | Hacker | |
| 4,940,667 A | 7/1990 | Goldstein et al. | |
| 4,962,462 A | 10/1990 | Fekete | |
| 4,968,393 A | 11/1990 | Mazur et al. | |
| 4,973,530 A | 11/1990 | Vanderborgh et al. | |
| 4,977,094 A | 12/1990 | Goldstein et al. | |
| 4,978,451 A | 12/1990 | Taylor | |
| 4,988,583 A | 1/1991 | Watkins et al. | |
| 4,988,593 A | 1/1991 | Takai | |
| 5,046,604 A | 9/1991 | Forhetz et al. | |
| 5,047,301 A | 9/1991 | Adlhart et al. | |
| 5,108,849 A | 4/1992 | Watkins et al. | |
| 5,186,903 A | 2/1993 | Cornwell | |
| 5,200,278 A | 4/1993 | Watkins et al. | |
| 5,205,841 A | 4/1993 | Vaiman | |
| 5,221,520 A | 6/1993 | Cornwell | |
| 5,229,222 A | 7/1993 | Tsutsumi et al. | |
| 5,264,299 A | 11/1993 | Krasij et al. | |
| 5,292,600 A | 3/1994 | Kaufman | |
| 5,294,410 A | 3/1994 | White | |
| 5,314,762 A | 5/1994 | Hamada et al. | |
| 5,366,820 A | 11/1994 | Tsutsumi et al. | |
| 5,372,617 A | 12/1994 | Kerrebrock et al. | |
| 5,382,478 A | 1/1995 | Chow et al. | |
| 5,401,589 A | 3/1995 | Palmer | |
| 5,514,353 A * | 5/1996 | Adlhart | 422/239 |
| 5,534,341 A | 7/1996 | Baines et al. | |
| 5,554,343 A | 9/1996 | Wade | |
| 5,557,188 A | 9/1996 | Piercey | |
| 5,593,640 A | 1/1997 | Long et al. | |
| 5,599,640 A | 2/1997 | Lee et al. | |
| 5,634,341 A | 6/1997 | Klanchar et al. | |
| 5,667,753 A | 9/1997 | Jacobs et al. | |
| 5,674,450 A | 10/1997 | Lin et al. | |
| 5,683,828 A | 11/1997 | Spear et al. | |
| 5,688,611 A | 11/1997 | Golben | |
| 5,702,491 A | 12/1997 | Long et al. | |
| 5,728,464 A | 3/1998 | Checketts | |
| 5,747,189 A | 5/1998 | Perkins | |
| 5,756,047 A | 5/1998 | West | |
| 5,770,739 A | 6/1998 | Lin et al. | |
| 5,785,934 A | 7/1998 | Jacobs et al. | |
| 5,804,329 A | 9/1998 | Amendola | |
| 5,833,934 A | 11/1998 | Adlhart | |
| 5,843,297 A | 12/1998 | Schmid et al. | |
| 5,858,587 A | 1/1999 | Yamane et al. | |
| 5,861,137 A | 1/1999 | Edlund | |
| 5,863,671 A | 1/1999 | Spear, Jr. et al. | |
| 5,876,666 A | 3/1999 | Lin et al. | |
| 5,927,651 A * | 7/1999 | Geders et al. | 244/135 B |
| 5,932,365 A | 8/1999 | Lin et al. | |
| 5,948,558 A | 9/1999 | Amendola | |
| 5,955,039 A | 9/1999 | Dowdy | |
| 5,961,923 A | 10/1999 | Nova et al. | |
| 5,962,155 A | 10/1999 | Kuranaka et al. | |
| 5,976,725 A | 11/1999 | Gamo et al. | |
| 5,996,976 A | 12/1999 | Murphy et al. | |
| 5,997,594 A | 12/1999 | Edlund et al. | |
| 5,997,812 A | 12/1999 | Burnham et al. | |
| 5,997,821 A | 12/1999 | Joshi | |
| 6,017,496 A | 1/2000 | Nova et al. | |
| 6,051,128 A | 4/2000 | Nacamuli et al. | |
| 6,051,331 A | 4/2000 | Spear, Jr. et al. | |
| 6,066,409 A | 5/2000 | Ronne et al. | |
| 6,072,299 A | 6/2000 | Kurle et al. | |
| 6,090,312 A | 7/2000 | Ziaka et al. | |
| 6,096,219 A | 8/2000 | Green et al. | |
| 6,096,286 A | 8/2000 | Autenrieth | |
| 6,097,175 A | 8/2000 | Yoon | |
| 6,100,026 A | 8/2000 | Nova et al. | |
| 6,106,964 A | 8/2000 | Voss et al. | |
| 6,106,965 A | 8/2000 | Hirano et al. | |
| 6,106,968 A | 8/2000 | Johnson et al. | |
| 6,106,970 A | 8/2000 | Kalarney | |
| 6,108,968 A | 8/2000 | Peng | |
| 6,110,429 A | 8/2000 | Johansing, Jr. | |
| 6,110,611 A | 8/2000 | Stuhler et al. | |
| 6,152,597 A | 11/2000 | Potega | |
| 6,156,450 A | 12/2000 | Bailey | |
| 6,175,217 B1 * | 1/2001 | Da Ponte et al. | 322/19 |
| 6,198,253 B1 | 3/2001 | Kurle et al. | |
| 6,221,117 B1 | 4/2001 | Edlund et al. | |
| 6,231,825 B1 | 5/2001 | Colby et al. | |
| 6,236,326 B1 | 5/2001 | Murphy | |
| 6,238,814 B1 | 5/2001 | Horiguchi et al. | |
| 6,248,469 B1 | 6/2001 | Formato et al. | |
| 6,250,078 B1 | 6/2001 | Amendola et al. | |
| 6,268,077 B1 | 7/2001 | Kelley et al. | |
| 6,274,093 B1 | 8/2001 | Long et al. | |
| 6,284,459 B1 | 9/2001 | Nova et al. | |
| 6,289,889 B1 | 9/2001 | Bell et al. | |
| 6,309,611 B1 | 10/2001 | Tabatabaie-Raissi et al. | |
| 6,312,848 B1 | 11/2001 | Kilb et al. | |
| 6,315,870 B1 | 11/2001 | Tabatabaie-Raissi et al. | |
| 6,334,936 B1 | 1/2002 | Tabatabaie-Raissi et al. | |
| 6,337,120 B1 | 1/2002 | Sasaki et al. | |
| 6,342,128 B1 | 1/2002 | Tabatabaie-Raissi et al. | |
| 6,381,156 B1 | 4/2002 | Sakai et al. | |
| 6,387,228 B1 | 5/2002 | Maget | |
| 6,387,556 B1 | 5/2002 | Fuglevand et al. | |
| 6,387,557 B1 | 5/2002 | Krasij et al. | |
| 6,399,234 B2 | 6/2002 | Bonk et al. | |
| 6,428,918 B1 | 8/2002 | Fuglevand et al. | |
| 6,433,129 B1 | 8/2002 | Amendola et al. | |
| 6,454,871 B1 | 9/2002 | Labib et al. | |
| 6,468,682 B1 | 10/2002 | Fuglevand et al. | |
| 6,468,694 B1 | 10/2002 | Amendola | |
| 6,483,274 B2 | 11/2002 | Lee | |
| 6,495,278 B1 | 12/2002 | Schmid et al. | |
| 6,497,973 B1 | 12/2002 | Amendola | |
| 6,497,974 B2 | 12/2002 | Fuglevand | |
| 6,500,577 B2 | 12/2002 | Foster | |
| 6,503,649 B1 | 1/2003 | Czajkowski et al. | |
| 6,503,711 B1 | 1/2003 | Krull et al. | |
| 6,524,542 B2 | 2/2003 | Amendola et al. | |
| 6,531,630 B2 | 3/2003 | Vidalin | |
| 6,533,827 B1 | 3/2003 | Cisar et al. | |
| 6,534,033 B1 | 3/2003 | Amendola et al. | |
| 6,541,147 B1 | 4/2003 | McLean et al. | |
| 6,544,400 B2 | 4/2003 | Hockaday et al. | |
| 6,544,679 B1 | 4/2003 | Petillo et al. | |
| 6,551,561 B1 | 4/2003 | Tabatabaie-Raissi et al. | |
| 6,554,400 B1 | 4/2003 | Aoki | |
| 6,576,350 B2 | 6/2003 | Buxbaum | |
| 6,576,361 B1 | 6/2003 | Barton | |
| 6,582,666 B2 | 6/2003 | Tabatabaie-Raissi et al. | |
| 6,583,523 B1 | 6/2003 | Bhate | |
| 6,586,563 B1 | 7/2003 | Ortega et al. | |
| 6,592,741 B2 | 7/2003 | Nakanishi et al. | |
| 6,599,653 B1 | 7/2003 | Cummins et al. | |
| 6,602,631 B1 | 8/2003 | Cisar et al. | |
| 6,605,377 B1 | 8/2003 | Kimbara et al. | |
| 6,607,857 B2 | 8/2003 | Blunk et al. | |
| 6,610,112 B1 | 8/2003 | Klock et al. | |
| 6,645,651 B2 | 11/2003 | Hockaday et al. | |
| 6,649,097 B2 | 11/2003 | Sasaki et al. | |
| 6,653,003 B1 | 11/2003 | Tsai et al. | |
| 6,670,444 B2 | 12/2003 | Amendola et al. | |
| 6,674,263 B2 * | 1/2004 | Agbossou et al. | 320/101 |
| 6,683,025 B2 | 1/2004 | Amendola et al. | |
| 6,685,570 B2 | 2/2004 | Zilberman et al. | |

| Patent Number | Date | Inventor(s) |
|---|---|---|
| 6,688,106 B2 | 2/2004 | Okusawa et al. |
| 6,696,204 B2 | 2/2004 | Sato et al. |
| 6,703,722 B2 | 3/2004 | Christensen |
| 6,706,909 B1 | 3/2004 | Snover et al. |
| 6,730,269 B2 | 5/2004 | Mirkin et al. |
| 6,733,916 B2 | 5/2004 | Mizuno |
| 6,743,542 B2 | 6/2004 | Krasij et al. |
| 6,745,801 B1 | 6/2004 | Cohen et al. |
| 6,746,496 B1 | 6/2004 | Kravitz et al. |
| 6,755,219 B1 | 6/2004 | Bolle |
| 6,764,786 B2 | 7/2004 | Morrow et al. |
| 6,766,817 B2 | 7/2004 | da Silva |
| 6,770,186 B2 | 8/2004 | Rosenfeld et al. |
| 6,773,839 B2 | 8/2004 | Fuglevand et al. |
| 6,777,127 B2 | 8/2004 | Einhart et al. |
| 6,783,741 B2 | 8/2004 | Edlund et al. |
| 6,787,008 B2 | 9/2004 | Joshi et al. |
| 6,790,416 B2 | 9/2004 | Mann et al. |
| 6,794,418 B2 | 9/2004 | Sogge et al. |
| 6,805,987 B2 | 10/2004 | Bai et al. |
| 6,811,764 B2 | 11/2004 | Jorgensen et al. |
| 6,811,906 B2 | 11/2004 | Bai et al. |
| 6,811,918 B2 | 11/2004 | Blunk et al. |
| 6,815,101 B2 | 11/2004 | De Vaal et al. |
| 6,815,110 B2 | 11/2004 | Marsh |
| 6,818,334 B2 | 11/2004 | Tsang |
| 6,821,499 B2 | 11/2004 | Jorgensen |
| 6,827,747 B2 | 12/2004 | Lisi et al. |
| 6,846,635 B1 | 1/2005 | Anderson et al. |
| 6,858,335 B2 | 2/2005 | Schmidt et al. |
| 6,861,167 B2 | 3/2005 | Wells et al. |
| 6,879,062 B2 | 4/2005 | Oates |
| 6,887,606 B2 | 5/2005 | Parr et al. |
| 6,887,701 B2 | 5/2005 | Anderson et al. |
| 6,899,967 B2 | 5/2005 | Johnson |
| 6,901,302 B2 | 5/2005 | Kami |
| 6,904,533 B2 | 6/2005 | Kuo et al. |
| 6,913,847 B2 | 7/2005 | Wells et al. |
| 6,918,404 B2 | 7/2005 | Dias da Silva |
| 6,932,847 B2 | 8/2005 | Amendola et al. |
| 6,939,529 B2 | 9/2005 | Strizki et al. |
| 6,946,104 B2 | 9/2005 | Rusta-Sallehy et al. |
| 6,953,100 B2 * | 10/2005 | Aberle et al. ............ 429/432 |
| 6,953,630 B2 | 10/2005 | Wells et al. |
| 6,960,401 B2 | 11/2005 | Barton et al. |
| 6,969,561 B2 | 11/2005 | De Vaal et al. |
| 6,979,504 B2 | 12/2005 | Manery |
| 7,002,265 B2 | 2/2006 | Potega |
| 7,004,207 B2 | 2/2006 | Finkelshtain et al. |
| 7,005,204 B2 * | 2/2006 | Aoyagi et al. ............ 429/431 |
| 7,019,105 B2 | 3/2006 | Amendola et al. |
| 7,052,671 B2 | 5/2006 | McClaine et al. |
| 7,052,793 B2 | 5/2006 | Formato et al. |
| 7,057,376 B2 | 6/2006 | Cook et al. |
| 7,059,769 B1 | 6/2006 | Potega |
| 7,066,586 B2 | 6/2006 | da Silva |
| 7,068,017 B2 | 6/2006 | Wilner et al. |
| 7,074,369 B2 | 7/2006 | Tabatabaie-Raissi et al. |
| 7,074,509 B2 | 7/2006 | Rosenfeld et al. |
| 7,083,657 B2 | 8/2006 | Mohring et al. |
| 7,097,813 B2 | 8/2006 | Ord et al. |
| 7,105,033 B2 | 9/2006 | Strizki et al. |
| 7,108,777 B2 | 9/2006 | Xu et al. |
| 7,112,891 B2 | 9/2006 | Johnson et al. |
| 7,122,263 B2 | 10/2006 | Imamura et al. |
| 7,147,692 B2 | 12/2006 | Fornai et al. |
| 7,153,605 B2 | 12/2006 | Horiguchi et al. |
| 7,166,269 B2 | 1/2007 | Tanaka et al. |
| 7,169,489 B2 | 1/2007 | Redmond |
| 7,179,638 B2 | 2/2007 | Anderson et al. |
| 7,199,535 B2 | 4/2007 | Welchko et al. |
| 7,245,039 B2 * | 7/2007 | DuHamel ............ 290/44 |
| 7,259,019 B2 | 8/2007 | Pawliszyn et al. |
| 7,271,567 B2 | 9/2007 | Dunn et al. |
| 7,282,283 B2 | 10/2007 | Kelley et al. |
| 7,285,255 B2 | 10/2007 | Kadlec et al. |
| 7,291,191 B2 | 11/2007 | Kaye |
| 7,339,351 B2 | 3/2008 | Murakami et al. |
| 7,378,820 B2 * | 5/2008 | Liu et al. ............ 322/44 |
| 7,393,369 B2 | 7/2008 | Shurtleff |
| 7,418,315 B2 * | 8/2008 | Nakamura et al. ............ 700/296 |
| 7,485,383 B2 * | 2/2009 | Aoyagi et al. ............ 429/431 |
| 7,572,536 B2 | 8/2009 | Shibata et al. |
| 7,648,786 B2 * | 1/2010 | Shurtleff et al. ............ 429/421 |
| 7,938,879 B2 * | 5/2011 | Woodall et al. ............ 75/388 |
| 7,947,094 B2 * | 5/2011 | Fiebig ............ 48/118.5 |
| 2001/0000380 A1 | 4/2001 | Buxbaum |
| 2001/0025289 A1 | 9/2001 | Jenkins et al. |
| 2001/0043274 A1 | 11/2001 | Shepherd et al. |
| 2001/0045061 A1 | 11/2001 | Edlund et al. |
| 2001/0045364 A1 | 11/2001 | Hockaday et al. |
| 2001/0046616 A1 | 11/2001 | Mossman |
| 2001/0050218 A1 | 12/2001 | Tabatabaie-Raissi et al. |
| 2002/0001537 A1 | 1/2002 | Hlebovy et al. |
| 2002/0018742 A1 | 2/2002 | Hoke et al. |
| 2002/0018922 A1 | 2/2002 | Fuglevand et al. |
| 2002/0022162 A1 | 2/2002 | Kagitani |
| 2002/0022168 A1 | 2/2002 | Faris et al. |
| 2002/0022170 A1 | 2/2002 | Franklin et al. |
| 2002/0025462 A1 | 2/2002 | Nakanishi et al. |
| 2002/0031692 A1 | 3/2002 | Fuglevand et al. |
| 2002/0045075 A1 | 4/2002 | Pinto et al. |
| 2002/0045082 A1 | 4/2002 | Marsh |
| 2002/0045085 A1 | 4/2002 | Formato et al. |
| 2002/0058168 A1 | 5/2002 | Voss et al. |
| 2002/0072834 A1 * | 6/2002 | Scheffler et al. ............ 701/22 |
| 2002/0076598 A1 | 6/2002 | Bostaph et al. |
| 2002/0083643 A1 | 7/2002 | Amendola et al. |
| 2002/0106313 A1 | 8/2002 | Tabatabaie-Raissi et al. |
| 2002/0106541 A1 | 8/2002 | Yamada et al. |
| 2002/0106550 A1 | 8/2002 | Nishiki et al. |
| 2002/0136937 A1 | 9/2002 | Kelley et al. |
| 2002/0150804 A1 | 10/2002 | Srinivasan et al. |
| 2002/0165417 A1 | 11/2002 | Numaguchi et al. |
| 2002/0166286 A1 | 11/2002 | McClaine et al. |
| 2002/0171021 A1 | 11/2002 | Goretti |
| 2002/0176265 A1 | 11/2002 | Oates |
| 2002/0177015 A1 | 11/2002 | Fuglevand |
| 2002/0177018 A1 | 11/2002 | Fuglevand |
| 2002/0177042 A1 | 11/2002 | Amendola |
| 2002/0182470 A1 | 12/2002 | Agizy et al. |
| 2003/0001299 A1 | 1/2003 | Gopalsami et al. |
| 2003/0003038 A1 | 1/2003 | Amendola et al. |
| 2003/0008187 A1 | 1/2003 | Higashiyama et al. |
| 2003/0008194 A1 | 1/2003 | Cargneli et al. |
| 2003/0009942 A1 | 1/2003 | Amendola et al. |
| 2003/0012999 A1 | 1/2003 | Yoshioka et al. |
| 2003/0022031 A1 | 1/2003 | Manery |
| 2003/0022036 A1 | 1/2003 | Parr |
| 2003/0022037 A1 | 1/2003 | Parr et al. |
| 2003/0022038 A1 | 1/2003 | Vaal et al. |
| 2003/0022040 A1 | 1/2003 | Wells |
| 2003/0022041 A1 | 1/2003 | Barton et al. |
| 2003/0022042 A1 | 1/2003 | Wells et al. |
| 2003/0022045 A1 | 1/2003 | Wells et al. |
| 2003/0022050 A1 | 1/2003 | Barton et al. |
| 2003/0037487 A1 | 2/2003 | Amendola et al. |
| 2003/0039875 A1 | 2/2003 | Horguchi et al. |
| 2003/0049857 A1 | 3/2003 | Chan |
| 2003/0051785 A1 | 3/2003 | Gauthier et al. |
| 2003/0077493 A1 * | 4/2003 | Colborn et al. ............ 429/23 |
| 2003/0085111 A1 | 5/2003 | Tabatabaie-Raissi et al. |
| 2003/0091879 A1 | 5/2003 | Rusta-Sellehy et al. |
| 2003/0091882 A1 | 5/2003 | Schmidt et al. |
| 2003/0092877 A1 | 5/2003 | Amendola et al. |
| 2003/0098258 A1 | 5/2003 | Gregory et al. |
| 2003/0111908 A1 | 6/2003 | Christensen |
| 2003/0113259 A1 | 6/2003 | Rusta-Sallehy et al. |
| 2003/0114632 A1 | 6/2003 | Ortega et al. |
| 2003/0159354 A1 | 8/2003 | Edlund et al. |
| 2003/0162059 A1 | 8/2003 | Gelsey |
| 2003/0175566 A1 | 9/2003 | Fisher et al. |
| 2003/0180603 A1 | 9/2003 | Richards |
| 2003/0194596 A1 | 10/2003 | Ye et al. |
| 2003/0204993 A1 | 11/2003 | Holland et al. |
| 2003/0219371 A1 | 11/2003 | Amendola |
| 2003/0219641 A1 | 11/2003 | Petillo |
| 2003/0223926 A1 | 12/2003 | Edlund et al. |

| Pub. No. | Date | Inventor |
|---|---|---|
| 2003/0226763 A1 | 12/2003 | Narayanan et al. |
| 2003/0228252 A1 | 12/2003 | Shurtleff |
| 2003/0228505 A1 | 12/2003 | Tsang |
| 2003/0232225 A1 | 12/2003 | Maruyama et al. |
| 2003/0235724 A1 | 12/2003 | Ord et al. |
| 2003/0235749 A1 | 12/2003 | Haltiner, Jr. et al. |
| 2004/0005488 A1 | 1/2004 | Faris et al. |
| 2004/0009379 A1 | 1/2004 | Amendola et al. |
| 2004/0009392 A1 | 1/2004 | Petillo et al. |
| 2004/0011662 A1 | 1/2004 | Xu et al. |
| 2004/0023087 A1 | 2/2004 | Redmond |
| 2004/0025808 A1 | 2/2004 | Cheng |
| 2004/0031695 A1 | 2/2004 | Oloman et al. |
| 2004/0033194 A1 | 2/2004 | Amendola et al. |
| 2004/0035054 A1 | 2/2004 | Mohring et al. |
| 2004/0038098 A1 | 2/2004 | Imamura et al. |
| 2004/0043274 A1 | 3/2004 | Scartozzi et al. |
| 2004/0047801 A1 | 3/2004 | Petillo et al. |
| 2004/0052723 A1 | 3/2004 | Jorgensen |
| 2004/0053100 A1 | 3/2004 | Stanley et al. |
| 2004/0062680 A1 | 4/2004 | Kampa |
| 2004/0062957 A1 | 4/2004 | Kelley et al. |
| 2004/0065865 A1 | 4/2004 | Desgardin et al. |
| 2004/0067195 A1 | 4/2004 | Strizki et al. |
| 2004/0072041 A1 | 4/2004 | Koschany |
| 2004/0080297 A1 | 4/2004 | Leboe |
| 2004/0081884 A1 | 4/2004 | Bean et al. |
| 2004/0109374 A1 | 6/2004 | Sundar |
| 2004/0115493 A1 | 6/2004 | Kim |
| 2004/0120889 A1 | 6/2004 | Shah et al. |
| 2004/0121196 A1 | 6/2004 | Liu et al. |
| 2004/0126632 A1 | 7/2004 | Pearson et al. |
| 2004/0126635 A1 | 7/2004 | Pearson |
| 2004/0126641 A1 | 7/2004 | Pearson et al. |
| 2004/0137288 A1 | 7/2004 | Morgenstern |
| 2004/0146769 A1 | 7/2004 | Birschbach |
| 2004/0148857 A1 | 8/2004 | Strizki et al. |
| 2004/0160216 A1 | 8/2004 | Speranza et al. |
| 2004/0161646 A1 | 8/2004 | Rezachek et al. |
| 2004/0161652 A1 | 8/2004 | Ovshinsky et al. |
| 2004/0166057 A1 | 8/2004 | Schell et al. |
| 2004/0180247 A1 | 9/2004 | Higashiyama et al. |
| 2004/0180253 A1 | 9/2004 | Fisher |
| 2004/0185316 A1 | 9/2004 | Wells et al. |
| 2004/0191152 A1 | 9/2004 | Amendola et al. |
| 2004/0191588 A1 | 9/2004 | Eshraghi et al. |
| 2004/0200903 A1 | 10/2004 | Ohya et al. |
| 2004/0205032 A1 | 10/2004 | Routtenberg et al. |
| 2004/0214054 A1 | 10/2004 | Shige et al. |
| 2004/0214056 A1 | 10/2004 | Gore |
| 2004/0214057 A1 | 10/2004 | Fuglevand et al. |
| 2004/0219398 A1 | 11/2004 | Calhoon |
| 2004/0219399 A1 | 11/2004 | Zhu et al. |
| 2004/0229107 A1 | 11/2004 | Smedley |
| 2004/0241065 A1 | 12/2004 | Kampa et al. |
| 2004/0253496 A1 | 12/2004 | Foster |
| 2004/0265658 A1 | 12/2004 | de Vaal et al. |
| 2005/0008908 A1 | 1/2005 | Kaye et al. |
| 2005/0013771 A1 | 1/2005 | Amendola |
| 2005/0014044 A1 | 1/2005 | Thirukkovalur et al. |
| 2005/0014060 A1 | 1/2005 | Suzuki |
| 2005/0016840 A1 | 1/2005 | Petillo |
| 2005/0017216 A1 | 1/2005 | Poetsch et al. |
| 2005/0017602 A1 | 1/2005 | Arms et al. |
| 2005/0017646 A1 | 1/2005 | Boulos et al. |
| 2005/0031925 A1 | 2/2005 | Ofer et al. |
| 2005/0036941 A1 | 2/2005 | Bae et al. |
| 2005/0038267 A1 | 2/2005 | Poetsch et al. |
| 2005/0040785 A1 | 2/2005 | Barnes et al. |
| 2005/0048345 A1 | 3/2005 | Meacham |
| 2005/0052165 A1 | 3/2005 | Willner et al. |
| 2005/0058595 A1 | 3/2005 | Shi et al. |
| 2005/0058885 A1 | 3/2005 | Brocklin et al. |
| 2005/0058990 A1 | 3/2005 | Guia et al. |
| 2005/0069746 A1 | 3/2005 | Kabasawa |
| 2005/0084723 A1 | 4/2005 | Mori |
| 2005/0100792 A1 | 5/2005 | Visco et al. |
| 2005/0106097 A1 | 5/2005 | Graham et al. |
| 2005/0106429 A1 | 5/2005 | Keefer |
| 2005/0118470 A1 | 6/2005 | Harada et al. |
| 2005/0124016 A1 | 6/2005 | LaDu et al. |
| 2005/0132640 A1 | 6/2005 | Kelly et al. |
| 2005/0135996 A1 | 6/2005 | Ortega et al. |
| 2005/0136300 A1 | 6/2005 | Dyer |
| 2005/0148091 A1 | 7/2005 | Kitaguchi et al. |
| 2005/0151517 A1 | 7/2005 | Cook et al. |
| 2005/0158595 A1* | 7/2005 | Marsh et al. .................... 429/19 |
| 2005/0162122 A1 | 7/2005 | Dunn et al. |
| 2005/0198963 A1* | 9/2005 | Wai et al. ...................... 60/698 |
| 2005/0214602 A1 | 9/2005 | Sinha et al. |
| 2005/0221136 A1 | 10/2005 | Nakakubo et al. |
| 2005/0233184 A1 | 10/2005 | Dunn et al. |
| 2005/0233185 A1 | 10/2005 | Dunn et al. |
| 2005/0238573 A1 | 10/2005 | Zhang et al. |
| 2005/0247552 A1 | 11/2005 | TeGrotenhuis et al. |
| 2005/0268555 A1 | 12/2005 | Amendola et al. |
| 2005/0271905 A1 | 12/2005 | Dunn et al. |
| 2005/0276727 A1 | 12/2005 | Pawliszyn et al. |
| 2005/0276746 A1 | 12/2005 | Zhang et al. |
| 2006/0006108 A1 | 1/2006 | Arias et al. |
| 2006/0008687 A1 | 1/2006 | Kaye et al. |
| 2006/0014069 A1 | 1/2006 | Kaye et al. |
| 2006/0014070 A1 | 1/2006 | Kaye et al. |
| 2006/0021279 A1 | 2/2006 | Mohring et al. |
| 2006/0024543 A1 | 2/2006 | Kaye et al. |
| 2006/0024553 A1 | 2/2006 | Kaye et al. |
| 2006/0024554 A1 | 2/2006 | Kaye et al. |
| 2006/0029848 A1 | 2/2006 | Kaye et al. |
| 2006/0051659 A1 | 3/2006 | Kelly et al. |
| 2006/0055175 A1* | 3/2006 | Grinblat .......................... 290/54 |
| 2006/0058527 A1 | 3/2006 | Kirsch et al. |
| 2006/0059778 A1 | 3/2006 | Shurtleff et al. |
| 2006/0073365 A1 | 4/2006 | Kaye |
| 2006/0078764 A1 | 4/2006 | Yang et al. |
| 2006/0078770 A1 | 4/2006 | Takahashi et al. |
| 2006/0090397 A1 | 5/2006 | Edlund et al. |
| 2006/0099465 A1 | 5/2006 | Kelley et al. |
| 2006/0099472 A1 | 5/2006 | Hsu |
| 2006/0102489 A1 | 5/2006 | Kelly |
| 2006/0102491 A1 | 5/2006 | Kelly et al. |
| 2006/0113129 A1* | 6/2006 | Tabata .......................... 180/65.2 |
| 2006/0127716 A1 | 6/2006 | Lehmann |
| 2006/0127733 A1 | 6/2006 | Kaschmitter et al. |
| 2006/0141332 A1 | 6/2006 | Cortright et al. |
| 2006/0144701 A1 | 7/2006 | Kelly |
| 2006/0152085 A1* | 7/2006 | Flett et al. ...................... 307/75 |
| 2006/0158037 A1* | 7/2006 | Danley et al. .................. 307/64 |
| 2006/0166045 A1 | 7/2006 | Ryoichi |
| 2006/0169593 A1 | 8/2006 | Xu et al. |
| 2006/0172162 A1 | 8/2006 | Pearson |
| 2006/0191198 A1 | 8/2006 | Rosenzweig et al. |
| 2006/0191199 A1 | 8/2006 | Rosenzweig et al. ............. 48/61 |
| 2006/0194102 A1 | 8/2006 | Keshishian et al. |
| 2006/0196112 A1 | 9/2006 | Berry et al. |
| 2006/0204806 A1 | 9/2006 | Takada et al. |
| 2006/0210841 A1 | 9/2006 | Wallace et al. |
| 2006/0225350 A1 | 10/2006 | Spallone et al. |
| 2006/0236606 A1 | 10/2006 | Strizki et al. |
| 2006/0246329 A1* | 11/2006 | Gopal et al. .................... 429/18 |
| 2006/0269470 A1 | 11/2006 | Zhang et al. |
| 2006/0276938 A1* | 12/2006 | Miller .......................... 700/295 |
| 2006/0292067 A1 | 12/2006 | Zhang et al. |
| 2006/0292420 A1 | 12/2006 | Goto et al. |
| 2006/0293173 A1 | 12/2006 | Zhang et al. |
| 2007/0011251 A1 | 1/2007 | McNamara et al. |
| 2007/0015030 A1 | 1/2007 | Cho et al. |
| 2007/0020510 A1 | 1/2007 | Dunn et al. |
| 2007/0031726 A1 | 2/2007 | Dunn et al. |
| 2007/0037023 A1 | 2/2007 | Dunn et al. |
| 2007/0042233 A1 | 2/2007 | Lyman et al. |
| 2007/0072029 A1* | 3/2007 | Masunishi et al. .............. 429/26 |
| 2007/0081939 A1 | 4/2007 | Berry et al. |
| 2007/0099039 A1 | 5/2007 | Galloway |
| 2007/0100506 A1* | 5/2007 | Teichmann .................... 700/297 |
| 2007/0116600 A1 | 5/2007 | Kochar et al. |
| 2007/0141413 A1 | 6/2007 | Nielsen et al. |
| 2007/0166582 A1 | 7/2007 | Okamoto |
| 2007/0186876 A1 | 8/2007 | Elwart et al. |

| | | | |
|---|---|---|---|
| 2007/0189940 A1 | 8/2007 | Shurtleff et al. | |
| 2007/0190377 A1 | 8/2007 | Elwart et al. | |
| 2007/0212281 A1 | 9/2007 | Kadlec et al. | |
| 2007/0212287 A1 | 9/2007 | Brunengo | |
| 2007/0243431 A1 | 10/2007 | Zhu et al. | |
| 2007/0244324 A1 | 10/2007 | Brady et al. | |
| 2007/0259220 A1 | 11/2007 | Redmond | |
| 2007/0264534 A1 | 11/2007 | Zhang et al. | |
| 2007/0271844 A1 | 11/2007 | Mohring et al. | |
| 2007/0274904 A1 | 11/2007 | Popham et al. | |
| 2007/0284166 A1 | 12/2007 | Maier et al. | |
| 2007/0287054 A1 | 12/2007 | Ueda et al. | |
| 2008/0012432 A1 | 1/2008 | Togare | |
| 2008/0015361 A1 | 1/2008 | Khare et al. | |
| 2008/0021602 A1 | 1/2008 | Kingham et al. | |
| 2008/0052145 A1* | 2/2008 | Kaplan et al. | 705/8 |
| 2008/0063913 A1 | 3/2008 | Hirayama | |
| 2008/0070076 A1 | 3/2008 | Makita et al. | |
| 2008/0195255 A1* | 8/2008 | Lutze et al. | 700/291 |
| 2009/0025293 A1 | 1/2009 | Patton et al. | |
| 2009/0035617 A1* | 2/2009 | Ogino et al. | 429/17 |
| 2009/0062969 A1* | 3/2009 | Chandra et al. | 700/291 |
| 2009/0326729 A1* | 12/2009 | Hakim et al. | 700/295 |
| 2010/0266917 A1* | 10/2010 | Kelley et al. | 429/429 |
| 2011/0208365 A1* | 8/2011 | Miller | 700/291 |

FOREIGN PATENT DOCUMENTS

| | | |
|---|---|---|
| JP | 54121292 | 9/1979 |
| JP | 59078901 | 10/1982 |
| JP | 2005093164 | 4/2005 |
| JP | 2005116211 | 4/2005 |

OTHER PUBLICATIONS

Keller et al, Hybrid energy storage systems for satnd alone electric power systems: optimization of system performance and cost through control strategies, pp. 1139-1156.*
Smith et al, "Enabling Fuel Cells for StnadbyPower- Chemical Hydride Fueling Technology", IEEE, Sep. 2004, pp. 65-72.*
Keller et al, Hybrid energy storage for stand-alone electric power systems: optimization of system peformance and cost through control strategies, Nov. 8, 1999, pp. 1139-1156.*
Amendola et al, "A safe, portable, hydrogen gas generator using aqueous borohydride solution and Ru catalyst", 2000. pp. 969-975.*
DolceraWiki, "Hybrid Electric Vehicle Battery System," May 14, 2008, http://www.dolcera.com/wiki/index.php?title=Hybrid_Elcetric_Vehicle_Battery_System.
Liu et al. "Power Balance Control and Voltage Conditioning for Fuel Cellconverter with Multiple Sources," Power Electronics Specialists Conference, 2002. vol. 4, Issue, 2002 pp. 2001-2006.
Fingersh, "Optimized Hydrogen and Electricity Generation from Wind," Jun. 2003, National Renewable Energy Laboratory, Golden, Colorado.
Penney et al. "Plugging in to Renewable Communities: How Transportation Based on Renewable Energy-Powered Communities May Solve Our Addiction to Fossil Resources," Solar Today, May/Jun. 2006. http://www.solartoday.org/2006/may_june06/plugging_in.html.
"New Hybrid Control System for EFOY Fuel Cells", Fuel Cell Today, Jan. 14, 2008, http://www.fuelcelltoday.com/online/news/articles/2008-01/New-hybrid-control-system-for-EF.
European Search Report, App. No. 08782389.4-1227/2181477, PCT/US2008071181, Jul. 1, 2011.
Fuel Chemistry News Newsletter of the ACS Division of Fuel Chemistry, vol. 82, No. 2, Fall 2003.
"VI.B.4 DOE Chemical Hydrogen Storage Center of Excellence" Tumas, W. et al., FY 2005 Progress Report.
"Review of Chemical Processes for the Synthesis of Sodium Borohydride" Wo, Y. et al., Millennium Cell Inc., Aug. 2004.
Messina-Boyer, Chris. "Millennium Cell Receives Patent on System for Hydrogen Generation," Millennium Cell, Inc., Eatontown, News, Mar. 18, 2003.
"A Novel High Power Density Borohydride-Air Cell," Amendola S.C. et al., Journal of Power Sources, vol. 84, No. 1, Nov. 1999, pp. 130-133(4).
"Enabling Fuel Cells for Standby Power-Chemical Hydride Fueling Technology," Smith, G.M., et al. Millennium Cell Inc., Eatontown, Telecommunications Energy Conference, 2004, Sep. 19-23, 2004.
"Recent Advances in Hydrogen Storage in Metal-Containing Inorgainc Nanostructures and Related Materials," Seayad, A.M., et al. Copyright 2004 May 19, 2004.
"Hydrogn Generation Via Sodium Borohydride," Mohring, R.M., et al. Millennium Cell, Inc., Eatontown, AIP Conference Proceedings-Jul. 11, 2003-vol. 671, Issue 1, pp. 90-100.
"Solid Storage," Luzader, R., Millennium Cell, Inc., Eatontown, News, Jun./Jul. 2003.
"Will Fuel Cells Replace Batteries in Mobile Devices?" Paulson, L.D. Millennium Cell, Inc.' Eatontown, News, Nov. 2003.

* cited by examiner

APPARATUS, SYSTEM, AND METHOD TO MANAGE THE GENERATION AND USE OF HYBRID ELECTRIC POWER

CROSS-REFERENCES TO RELATED APPLICATIONS

This application claims the benefit of U.S. Provisional Patent Application No. 60/951,925 entitled "APPARATUS, SYSTEM, AND METHOD TO MANAGE THE GENERATION AND USE OF HYBRID ELECTRIC POWER" and filed on Jul. 25, 2007 for Ken Pearson, et. al which is incorporated herein by reference. This application incorporates by reference U.S. patent application Ser. No. 10/459,991 filed Jun. 11, 2003, Ser. No. 11/270,947 filed Nov. 12, 2005, Ser. No. 11/740,349 filed Apr. 26, 2007, Ser. No. 11/828,265 filed Jul. 25, 2007, Ser. No. 11/829,019 filed Jul. 26, 2007, Ser. No. 11/829,035 filed Jul. 26, 2007, Ser. No. 12/179,554 filed Jul. 24, 2008, and Ser. No. 12/179,578 filed Jul. 24, 2008; and U.S. Provisional Patent Application Ser. No. 60/951,903 filed Jul. 25, 2007, 60/951,907 filed Jul. 25, 2007, and 61/059,743 filed Jun. 6, 2008, each of which is incorporated by reference herein in its entirety.

BACKGROUND OF THE INVENTION

1. Field of the Invention

This invention relates to hybrid electric power and more particularly relates to managing the generation, storage, and distribution of hybrid electric power.

2. Description of the Related Art

As the cost of fossil fuels increases, pollution increases, and the worldwide supply of fossil fuels decreases, alternative energy sources are becoming increasingly important. Non-fuel-based energy, such as that provided by most renewable resources, is often efficient, readily available, and environmentally friendly. However, users have little control over the sources of most non-fuel-based energy, such as the sun and the wind. When one desires more power/energy, one cannot increase the sunlight or the wind speed accordingly to deliver it. Alternatively, if one is using less power/energy than is being generated, one cannot easily store excess sunlight or wind for later use.

Fuel-based energy, such as that provided by hydrogen or fossil fuels, can be generated on demand as power/energy needs arise. A request for increased power/energy cannot always be met instantaneously, however, because of energy conversion delays inherent in fuel-based energy generation. For example, increasing a flow of hydrogen to a hydrogen fuel cell may not cause an immediate increase in the output of electrical power from the hydrogen fuel cell. The increased hydrogen may also need to be converted to hydrogen from a hydrogen fuel source, which may introduce additional delays. Other fuel-based energy often has similar delays.

Accordingly, what is needed is an improved apparatus, system, and method for managing the generation and use of hybrid electric power that overcome the problems and disadvantages of the prior art. The apparatus, system, and method should provide efficient, on demand power/energy, and should conserve excess power/energy. In particular, the apparatus, system, and method should manage energy conversion delays, and efficiently balance power/energy that is delivered to an electric load.

SUMMARY OF THE INVENTION

From the foregoing discussion, it should be apparent that a need exists for an apparatus, system, and method that manages the generation and use of hybrid electric power. Beneficially, such an apparatus, system, and method would efficiently manage energy conversion delays and balance electric power that is delivered to an electric load.

The present invention has been developed in response to the present state of the art, and in particular, in response to the problems and needs in the art that have not yet been fully solved by currently available hybrid electric power generation and management systems. Accordingly, the present invention has been developed to provide an apparatus, system, and method for managing the generation and use of hybrid electric power that overcome many or all of the above-discussed shortcomings in the art.

The apparatus to manage the generation and use of hybrid electric power is provided with a plurality of modules configured to perform the steps of managing the generation and the use of hybrid electric power. These modules, in the described embodiments, include a monitoring module, a determination module, a regulation module, an energy conservation module, a prioritization module, a user override module, and a prediction module.

In one embodiment, the monitoring module receives signals from one or more sensors. The signals, in a further embodiment, comprise energy level information of an electric energy storage device, power/energy level information of one or more energy converters, and power level information of an electric load. In another embodiment, the signals may comprise hydrogen or other fuel pressure or status information.

The determination module, in one embodiment, compares the signals to determine whether power/energy from the one or more energy converters satisfies the electric load. In a further embodiment, the determination module determines whether a power level of the electric energy storage device satisfies a predefined threshold level. The predefined threshold level, in one embodiment, is based on an energy conversion delay of one or more of the one or more energy converters.

In another embodiment, the regulation module adjusts the electric power from the one or more energy converters in response to a determination by the determination module that the electric power from the one or more energy converters does not satisfy the electric load threshold. In a further embodiment, the regulation module increases the electric power from the one or more energy converters in response to a determination by the determination module that the electric power from the one or more energy converters does not satisfy the electric load and that the power level of the electric energy storage device does not satisfy the predefined threshold level.

In one embodiment, the energy conservation module stores excess electric energy from the one or more energy converters as an alternate energy type in response to a determination by the determination module that the electric power from the one or more energy converters satisfies the electric load. In another embodiment, the energy conservation module causes at least one of the one or more energy converters to convert a secondary fuel to a primary fuel, and the primary fuel comprises the alternate energy type. The alternate energy type, in one embodiment, is selected from the group consisting of hydrogen gas, heat energy, chemical energy, and potential energy. The energy conservation module, in another embodiment, charges the electric energy storage device in response to a substantially full alternate energy storage device.

The prioritization module, in one embodiment, balances a supply of electric power delivered to the electric load based on a prioritization of electric sources. In one embodiment, in the prioritization of electric sources, a priority of the nonfuel-based energy converters is higher than a priority of the electric energy storage device, and the priority of the electric energy storage device is higher than a priority of the fuel-based energy converters. In another embodiment, the prioritization of electric sources is selected based on one or more of an energy conversion cost, an energy conversion efficiency, and an energy conversion delay. In another embodiment, the user override module overrides the prioritization of electric sources based on user input.

In one embodiment, the prediction module makes a prediction of an upcoming power draw of the electric load based on a historic power draw of the electric load. In another embodiment, the determination module is further configured to adjust the electric power from the one or more energy converters based on the prediction.

A system of the present invention is also presented to manage the generation and use of hybrid electric power. The system may be embodied by one or more energy converters, an electric energy storage device, one or more sensors, a controller, and a power interface.

The one or more energy converters, in one embodiment, each convert an energy source to electric power. In one embodiment, the electric energy storage device stores and supplies the electric power from the one or more energy converters. The electric energy storage device, in a further embodiment, comprises an energy storage capacity configured to substantially satisfy an power draw of the electric load for at least twelve hours, and the one or more energy converters are configured to output an amount of electric power satisfying an average power draw of the electric load and less than a peak power draw of the electric load. In one embodiment, at least one of the one or more energy converters comprises a collapsible structure. In a further embodiment, at least one of the one or more energy converters is a non-fuel-based energy converter selected from the group consisting of photovoltaic cells, wind turbines, water turbines, geothermal turbines, solar concentrators, and waste heat co-generators.

In another embodiment, at least one of the one or more energy converters is a fuel-based energy converter selected from the group consisting of fuel cells, microturbine systems, hydrogen reformers, hydrogen electrolysis systems, and internal combustion engine generators. In a further embodiment, at least one of the one or more energy converters is configured to convert a secondary fuel to a primary fuel. In another embodiment, the secondary fuel is selected from the group consisting of water and hydrocarbons, and the primary fuel comprises hydrogen. In one embodiment, the secondary fuel comprises a chemical hydride, and the primary fuel comprises hydrogen. In a further embodiment, the chemical hydride comprises a solid anhydrous chemical hydride reactant and an activating agent.

The one or more sensors, in a further embodiment, measure a power level of the electric energy storage device, a power level of the one or more energy converters, and a power level of an electric load coupled to the one or more energy converters and to the electric energy storage device. In another embodiment, the sensors further receive an energy source status and an electric power generation potential of the one or more energy converters. The electric power generation potential, in one embodiment, comprises a measured gas pressure of produced hydrogen generated by the one or more energy converters.

In one embodiment, the power interface is configured to electrically couple the one or more sensors, the electric energy storage device, and the controller. In a further embodiment, the power interface comprises one or more standardized ports, each of the standardized ports configured to transfer communication signals and electric power from a corresponding pluggable connector of one of the one or more energy converters. In a further embodiment, the standardized ports removably couple the corresponding pluggable connector to the power interface.

In one embodiment, the controller determines whether the power level of the one or more energy converters satisfies the electric load. In a further embodiment, the controller determines whether the power level of the electric energy storage device satisfies a predefined threshold level. In another embodiment, the controller increases the power level of the one or more energy converters in response to a determination that the power level of the one or more energy converters does not satisfy the electric load and that the power level of the electric energy storage device fails to satisfy the predefined threshold level. In a further embodiment, the controller is further configured to receive customized energy converter type definitions and to control energy converters corresponding to the customized energy converter type definitions.

A computer program product of the present invention is also presented to perform the operations for managing the generation and use of electric power. The operations, in one embodiment, substantially include the steps of operation of the apparatus to manage the generation and use of hybrid electric power presented above.

In one embodiment, the computer program product comprises an operation for receiving signals from one or more sensors, the signals comprising power level information of an electric energy storage device, power level information of one or more hydrogen-based energy converters, pressure level information of a hydrogen storage device, and power level information of an electric load. In another embodiment, the computer program product comprises an operation for determining whether electric power from the one or more hydrogen-based energy converters satisfies the electric load. In a further embodiment, the computer program product comprises an operation for determining whether a power level of the electric energy storage device satisfies a predefined threshold level.

The computer program product, in one embodiment, comprises an operation for increasing hydrogen generation of a hydrogen generating device in response to a determination that the electric power from the one or more energy converters does not satisfy the electric load and that the power level of the electric energy storage device does not satisfy the predefined threshold level. In one embodiment, the computer program product comprises an operation for storing excess electric energy from the one or more energy converters as an alternate energy type in response to a determination that the electric power from the one or more hydrogen-based energy converters satisfies the electric load and that the power level of the electric energy storage device satisfies the predefined threshold level, and an operation for charging the electric energy storage device in response to a full alternate energy storage device. In a further embodiment, the computer program product comprises an operation for charging the electric energy storage device in response to a determination that the electric energy storage device does not satisfy the predefined threshold level.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
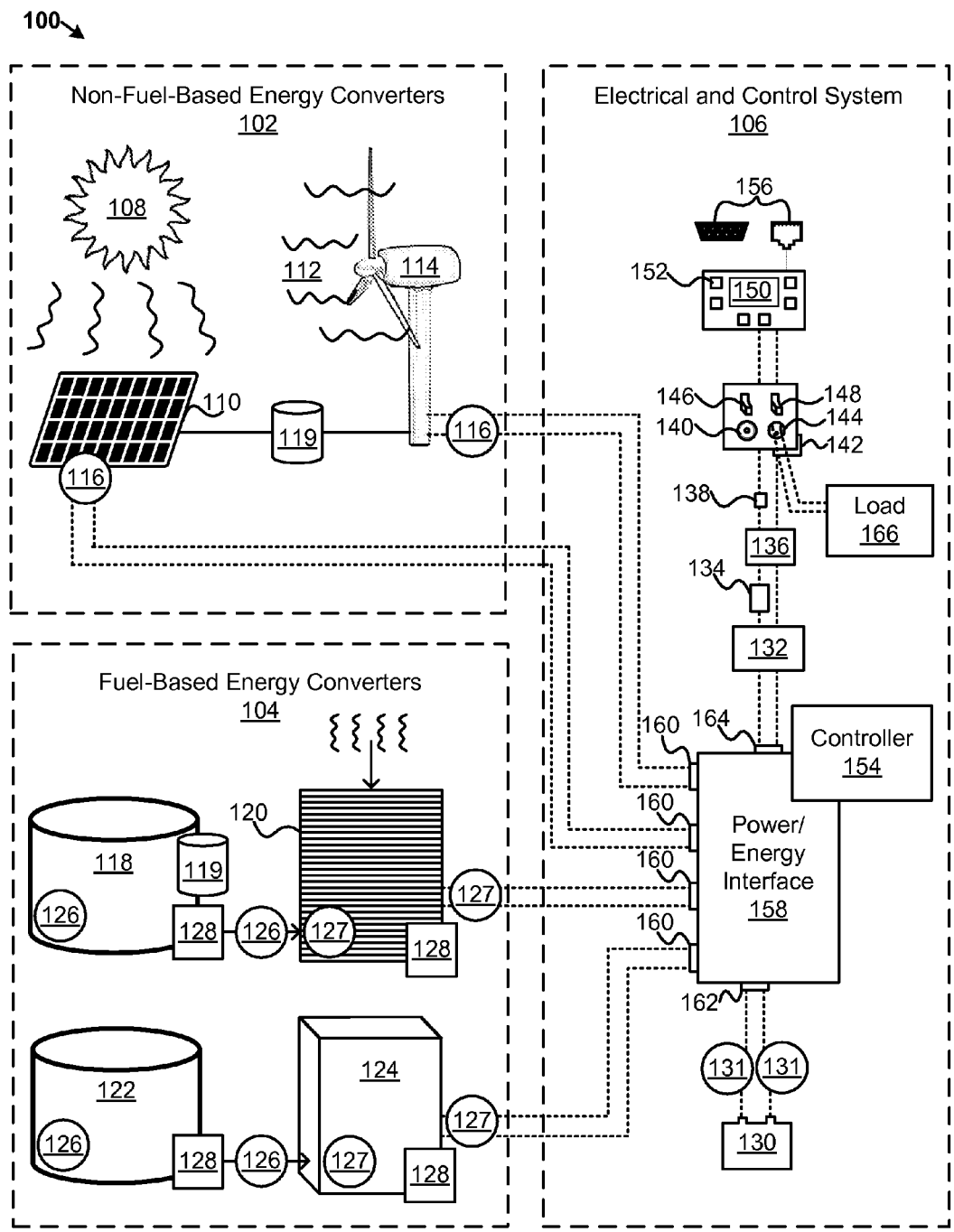
FIG. 1 is a schematic block diagram illustrating one embodiment of a system for managing the generation and use of hybrid electric power in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several computer readable media. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, radio frequency identification (RFID), or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for balancing the generation and use of hybrid electric power. In one embodiment, the system 100 may include one or more non-fuel-based energy converters 102, one or more fuel-based energy converters 104, one or more electric energy storage devices 130, and an electrical and control system 106.

In one embodiment, the one or more non-fuel-based energy converters 102 convert one or more non-fuel-based energy sources to electric power. The non-fuel-based energy sources may comprise the sun 108, the wind 112, geothermal sources, waves, water flow, and other natural, free, or other non-fuel-based energy sources. The non-fuel-based energy converters 102 may comprise photovoltaic cells 110, wind turbines 114, water turbines (not shown), geothermal turbines (not shown), solar concentrators/collectors (not shown), waste heat cogeneration (not shown), and the like.

In one embodiment, the system 100 is configured to be portable, and the one or more non-fuel-based energy converters 102 are physically modular such that each of the one or more non-fuel-based energy converters 102 may be detached from and reattached to the system 100. Each of the one or more non-fuel-based energy converters 102 may comprise a mechanical connector configured to removably couple the non-fuel-based energy converter 102 to the system 100 (such as through an energy interface described below). For example, the photovoltaic cells 110 may comprise a connection arm or the like that detachably mounts the photovoltaic cells 110 on the system 100. The connection arm may be manually or automatically adjustable, such that the photovoltaic cells 110 may be positioned to optimize generation efficiency substantially independent of the position of the system 100.

In one embodiment, one or more sensors 116, such as directional sensors, sunlight sensors, wind sensors, or the like, send signals to the electrical and control system 106 allowing the electrical and control system 106 to position one or more of the one or more non-fuel-based energy converters 102 or to position parts of the non-fuel-based energy converters 102 such as solar collectors. The mechanical connectors may comprise a standardized communications and power transfer interface, as described below in connection with the power/energy interface 158. In a further embodiment, one or more of the one or more non-fuel-based energy converters 102 is configured for portability, and may comprise a collapsible structure. Examples of non-fuel-based energy converters 102 having collapsible structures include photovoltaic cells 110 that comprise two or more panels that fold together, or wind turbines 114 that comprise collapsible turbine arms or the like.

In one embodiment, the non-fuel-based energy converters 102 comprise one or more sensors 116. In one embodiment, the one or more sensors 116 may comprise electrical sensors that monitor voltages and/or currents produced by the non-fuel-based energy converters 102. In one embodiment, either the voltage or the current has a substantially constant known value, and the one or more sensors 116 measure the other value that is not known. The measured value may be either the voltage or the current. With the constant known value and the measured value the controller 154 may calculate the electric power output of the non-fuel-based energy converters 102 using the known value and the measurement from the one or more sensors 116. In another embodiment, the one or more sensors 116 may comprise one or more energy source sensors such as sunlight sensors, wind speed sensors, water speed sensors, temperature sensors, and the like that measure an energy source status of the non-fuel-based energy sources. The one or more sensors 116 may be in communication with the electrical and control system 106, the one or more sensors 116 sending communication signals comprising power level information of the non-fuel-based energy converters 102 such as temperatures, speeds, voltages, currents, and the like, to the electrical and control system 106.

In one embodiment, the fuel-based energy converters 104 convert one or more fuel-based energy sources 118, 122 to electric power. The fuel-based energy sources 118, 122 may comprise hydrocarbons such as gasoline, diesel, kerosene, propane, natural gas, coal and the like; uranium or other nuclear fuels; hydrogen or hydrogen sources such as chemical hydrides, hydrocarbons, and water; biomass fuels; and other fuel-based energy sources. The fuel-based energy converters 104 may comprise one or more of a fuel cell system 120, such as proton exchange membrane (PEM) fuel cells or solid oxide fuel cells (SOFC), a microturbine system 124, hydrogen reformers (not shown), hydrogen electrolysis systems (not shown), hydrocarbon or hydrogen based electric generators (not shown) such as an internal combustion engine generator, and the like. The fuel-based energy converters 104 may make multiple conversions before generating electric power. For example, a fuel-based energy converter 104 may derive a fuel from a fuel-based energy source 118, 122 such as a chemical hydride, a hydrocarbon, water, or the like. The derived fuel source, in one embodiment, may be hydrogen, and the fuel-based energy converters 104 may perform a second conversion, converting the hydrogen to electric power.

In one embodiment, the system 100 is configured to be portable, and the one or more fuel-based energy converters 104 are physically modular such that each of the one or more fuel-based energy converters 104 may be detached from and reattached to the system 100. Each of the one or more fuel-based energy converters 104 may comprise a mechanical connector configured to removably couple the fuel-based energy converter 104 to the system 100. The mechanical connectors may comprise a standardized communications and power transfer interface, as described below in connection with the power/energy interface 158. In a further embodiment, one or more of the one or more fuel-based energy converters 104 is configured for portability.

The fuel-based energy sources 118, 122 may provide a primary fuel directly to the fuel-based energy converters 120, 124, or the fuel-based energy sources 118, 122 may provide one or more secondary fuels to a converter subsystem 128 for conversion to a primary fuel by the fuel-based energy converters 120, 124. For example, the fuel-based energy source 118 may comprise a pressurized storage tank of hydrogen gas that provides a hydrogen flow, or primary fuel, directly to the fuel cell system 120. Alternatively, the fuel-based energy source 118 may comprise a chemical hydride, water, natural gas, bio-diesel or another secondary fuel, and the converter subsystem 128 may comprise a converter such as a reformer, electrolysis system or the like that converts the secondary fuel source to hydrogen that the fuel cell system 120 or another fuel-based energy converter 124 such as a combustion engine may use for generating electric power.

In embodiments where one or more of the fuel-based energy sources 118, 122 comprise secondary fuels, the fuel-based energy sources 118, 122 may comprise an alternate energy storage device 119. The alternate energy storage device 119 may store excess primary fuel or potential energy for later conversion to electric power. Examples of potential energy storage include storing heat, creating steam, elevating an object such as water, winding a spring, or other potential energy storage that the fuel-based energy converters 104 and/or the non-fuel-based energy converters 102 can convert into electric power when requested. The alternate energy storage device 119 increases the efficiency of the system 100 by allowing excess electric energy generated by the non-fuel-based energy converters 102 and/or the fuel-based energy converters 104 to be stored as a primary fuel and/or as potential energy, instead of being wasted.

In one embodiment, the fuel-based energy converters 104 comprise one or more converter subsystems 128. Each of the converter subsystems 128 may receive control signals from the electrical and control system 106. The converter subsystems 128 may comprise air pumps, water pumps, cooling blowers, solenoid valves, electrical switches and the like that affect the rate that the fuel-based energy converters 120, 124 convert secondary fuels to primary fuels or the rate that the fuel-based energy converters 120, 124 generate electric power. For example, the converter subsystems 128 may comprise variable speed air pumps that pump air into the fuel cell system 120 to fuel the generation of electric power, water pumps that pump water into a chemical hydride to facilitate the generation of hydrogen by the fuel cell system 120, a valve on one of the fuel sources 118, 122, or the like.

Each of the fuel-based energy converters 104, in one embodiment, includes an inherent conversion delay, based on the fuel-based energy source 118, 122 that is used. The conversion delay may be greater for fuel-based energy converters 104 that are configured to convert a secondary fuel to a primary fuel by way of a converter subsystem 128 and to convert the primary fuel to electric power, than the delay for fuel-based energy converters 104 that are configured to use a primary fuel directly.

The conversion delay may comprise an amount of time from when the electrical and control system 106 sends a control signal to the fuel-based energy converters 104 to when the electric power output of the fuel-based energy converters 104 reflects the control signal. The control signal may be a startup signal, a shutdown signal, an electric power increase or decrease signal, or another control signal. The conversion delay may comprise an electric power generation time, the duration of time that the fuel-based energy converters 120, 124 take to convert a primary fuel to electric power, or the conversion delay may comprise both an electric power generation time and an energy source conversion time, the duration of time that the fuel-based energy converters 120, 124 in cooperation with one or more converter subsystems 128 take to convert a secondary fuel to a primary fuel, and the primary fuel to electric power.

In one embodiment, the fuel-based energy converters 104 comprise a fuel source 118 of hydrogen and a hydrogen fuel cell system 120. As described in the example above, the hydrogen source 118 may store hydrogen gas, or the hydrogen source 118 may comprise one or more hydrogen sources, such as chemical hydrides, water, hydrocarbons, and the like. In one embodiment, the hydrogen fuel cell system 120 may comprise one or more reformers (i.e. converter subsystems 128) that convert natural gas or other hydrocarbons from the hydrogen source 118 to hydrogen gas. In a further embodiment, a hydrogen converter subsystem 128 may use electrolysis to break down hydrogen containing compounds such as water from the hydrogen source 118 to release hydrogen gas for use in the fuel cell system 120. In an alternative embodiment, the fuel cell system 120 may use hydrogen directly from the hydrogen source 118 to generate electric power.

In another embodiment, the hydrogen converter subsystem 128 may use water and a chemical hydride from the hydrogen source 118 to generate hydrogen. In a further embodiment, the hydrogen converter subsystem 128 may introduce a liquid such as water to a liquid permeable pouch comprising one or more cavities containing a solid reactant such as a solid anhydrous chemical hydride. The solid reactant, in another embodiment, may further comprise a solid anhydrous activating agent to facilitate a reaction between the water and the reactant. In one embodiment, a chemical hydride may be considered a reducing compound containing hydrogen that generates hydrogen gas when it reacts with water or other oxidizing agents.

Example embodiments of a system to generate hydrogen from a chemical hydride, including examples of pouches, chemical hydrides, and activating agents are disclosed in U.S. patent application Ser. No. 11/829,019 filed Jul. 26, 2007, which is incorporated herein by reference in their entirety. Chemical hydrides may comprise organic or nonorganic compounds. Nonlimiting examples of chemical hydrides may include sodium borohydride, lithium borohydride, lithium aluminum hydride, lithium hydride, sodium hydride, and calcium hydride.

In one embodiment, the fuel-based energy converters 104 comprise a microturbine fuel source 122 and a microturbine system 124. In one embodiment, the microturbine system 124 is a hydrogen microturbine, and the microturbine fuel source 122 is substantially similar to the hydrogen source 118. In another embodiment, the microturbine system 124 is a natural gas microturbine or another hydrocarbon microturbine, and the microturbine fuel source 122 is a natural gas or other hydrocarbon fuel source. The microturbine system 124 may also be configured for co-generation of electric power from the excess heat that the microturbine system 124 generates. As discussed above, the fuel-based energy converters 104 may comprise converter subsystem 128 such as hydrogen reformers (not shown), hydrogen electrolysis (not shown), hydrocarbon electric generators (not shown) or other fuel-based energy converters 104.

In one embodiment, the non-fuel-based energy converters 102 provide the fuel-based energy converters 104 with electric power. The fuel-based energy converters 120, 124 and the converter subsystem 128 may use the electric power from the non-fuel-based energy converters 102 to convert a secondary fuel to a primary fuel, such as converting liquid water to hydrogen using electrolysis. In another embodiment, the non-fuel-based energy converters 102 and the fuel-based energy converters 104 both provide electric power to the electrical and control system 106 for powering of the system 100 and delivery to an electric load 166.

In one embodiment, the fuel-based energy converters 104 comprise one or more energy source sensors 126 and one or more energy converter sensors 127. The one or more energy source sensors 126 may comprise pressure sensors, weight sensors, volume sensors, counters, flow sensors, level sensors, floats, or other sensors that measure an energy source status of the fuel-based energy sources 118, 122. In one embodiment, the energy source sensors 126 monitor a state of fill, or remaining fuel, of the fuel-based energy sources 118, 122. The type of energy source sensor 126 employed depends on the type of fuel-based energy source 118, 122. For example, if the fuel based energy source 118, 122 is compressed hydrogen, the energy source sensor 126 may comprise a hydrogen pressure sensor.

In embodiments for which the fuel-based energy source 118, 122 provides a secondary fuel source such as a chemical hydride, a hydrocarbon, or water, the energy source sensor 126 may be positioned downstream from the converter subsystem 128. Similarly, the type of energy source sensor 126 employed depends on the type of converter subsystem 128. For example, where the fuel-based energy source 118, 122 is water and the converter subsystem 128 is an electrolysis system that converts the water to produce hydrogen, the energy source sensor 126 may comprise a hydrogen flow rate sensor, a hydrogen pressure sensor, or a combination of these.

The one or more energy converter sensors 127 may comprise electrical sensors that monitor one or more voltages and/or currents produced by the fuel-based energy converters 120, 124. The one or more energy converter sensors 127 may comprise one or more temperature sensors, pressure sensors, or other operating data or safety sensors. The energy source sensors 126 and the energy converter sensors 127 may be in communication with the electrical and control system 106, the energy source sensors 126 and the energy converter sensors 127 send communication signals comprising power level information of the one or more fuel-based energy converters 104, such as temperatures, speeds, voltages, currents, pressures, and the like to the electrical and control system 106.

In one embodiment, the system 100 maintains a generated fuel pressure, volume, flow rate, temperature, or the like at a substantially constant level based on readings by one or more of the energy converter sensors 127 and one or more energy source sensors 126. To maintain the sensor reading at a substantially constant level, the system 100 balances the consumption of energy, such as the consumption of hydrogen fuel in a fuel cell system 120, with the fuel provided by the fuel-based energy sources 118, 122, by increasing the release of fuel from the fuel-based energy sources 118, 122, by increasing the conversion of a secondary fuel to a primary fuel by a converter subsystem 128, or by increasing the release of power from the electric energy storage devices 130, to maintain a substantially constant sensor reading level while substantially satisfying electric power requirements of an electric load 166 coupled to the system 100. Alternatively, the system 100 may maintain the sensor readings at a dynamic level, based on the requirements of the electric load 166.

The system 100 provides two types of balancing. The first type of balancing is a balancing of the electric power supplied from the one or more non-fuel-based energy converters 102, from the one or more fuel-based energy converters 104, and from one or more electric energy storage devices 130 delivered to an electric load 166 coupled to the system 100. The electric power supplied may be balanced by switching between the non-fuel-based energy converters 102, the fuel-based energy converters 104, and the one or more electric energy storage devices 130 in response to monitored changes in the electric load 166, and/or by manipulating the amount of electric power generated by the fuel-based energy converters 104.

The second type of balancing is between the fuel-based energy converters 120, 124, non-fuel based energy converters 102, and one or more converter subsystem 128. The controller 104 uses the data from the energy source sensors 126 and the energy converter sensors 127 to determine how to maximize use of available energy regardless of the form of the energy. The form of the energy may be solar, mechanical (such as wind, wave, etc), and chemical, such as primary chemical sources such as hydrogen, secondary chemical sources such as chemical hydrides, water for electrolysis, photolysis, thermolysis or the like, and hydrocarbons for reformation.

The controller 104 processes the data from the energy source sensors 126 and the energy converter sensors 127 and determines whether to open certain switches or valves and or activate certain pumps and/or subsystems in order to make the most of the available non-fuel-based energy sources, primary fuel sources, secondary fuel sources, and other tertiary fuel sources as appropriate. For example, suppose a system 100 having non-fuel-based energy converter 102 such as photovoltaic cells 110, a fuel cell system 120, a microturbine system 124, and one or more electric energy storage devices 130 such as electric batteries. The controller 104 reviews the data from the energy source sensors 126 and the energy converter sensors 127 and the electric load 166. In this example, the controller 104 may determine that the load 166 demand is low, that the electrical output of the photovoltaic cells 110 is high, but that the batteries 130 are sufficiently charged. Consequently, in order to make the best use of available energy, the controller 104 may activate a converter subsystem 128 to generate hydrogen from water using electrolysis and store the generated hydrogen in the alternate energy storage device 119 (by activating pumps or the like) that holds hydrogen. In this manner, the non-fuel-based energy sources, primary fuel sources, secondary fuel sources, and other tertiary fuel sources are used as efficiently as possible.

Similarly, in a scenario in which the load 166 increases or endures for a prolonged period of time, the controller 104 detects a change in energy source sensors 126 that indicates that the electrical power currently being supplied cannot be maintained without bringing other non-fuel based energy converters 102 and or fuel-based energy converters 104 online to supplement the currently provided electrical power. The controller 104 may use thresholds for these energy source sensors 126 such that converters 104, 102 and potentially converter subsystem 128 are brought online before the impact of a conversion delay negatively affects the electrical power level being provided. Short term spikes in load 166 demand are overcome using the electric energy storage devices 130.

In one embodiment, the system 100 comprises an electrical and control system 106. In general, the electrical and control system 106 monitors communication signals from the sensors 116, 126, 127, balances a supply of electric power delivered to an electric load 166 between the electric power generated by the one or more fuel-based energy converters 104 and the electric power stored by an electric energy storage device 130, such that the supply of electric power satisfies the electric load 166, and controls the one or more converter subsystems 128 such that the communication signals from the sensors 116, 126, 127 satisfy one or more predefined threshold values.

The system 100 balances the electrical load 166 with fuel-based energy converters 104, non-fuel based energy converters 102 and electric energy storage devices 130. In one embodiment, this is done by controlling the water supplied to a chemical hydrides so that a fuel cell system 120 that uses hydrogen from the chemical hydride will generate the right amount of the electrical power required by the load 166.

If the chemical hydride converter 128 and fuel cell system 120 have a conversion delay or may not deliver the required amount called for by the electric load 166, the controller 154 compensates to improve the dynamic (transient) response of the system 100 to provide an instantaneous response to variations from the load 166, from the non-fuel-based energy converters 102, and/or from the other fuel-based energy converters 104. In some cases the controller 154 draws power from an electric energy storage device 130 such as a battery which acts as a reservoir to store the energy surplus from the fuel-based energy converters 104 and to compensate for power shortages if the power from the non-fuel-based energy converters 102 and/or the fuel-based energy converters 104 is insufficient. In addition, the system 100 may increase an electric power output of the fuel-based energy converters 104, by supplying water to the chemical hydride or the like, to replenish electric energy storage devices 130 like batteries so that a certain amount of electricity is always available.

In one embodiment, the electrical and control system 106 comprises one or more electric energy storage devices 130. In one embodiment, the electric energy storage devices 130 are rechargeable, and are charged by the non-fuel-based energy converters 102 and/or the fuel-based energy converters 104 when a portion of the electric power is not in use by the load 166, or after the load 166 has been disconnected, to use excess electric power and fuel during a shutdown cycle. The electric energy storage devices 130 provide instantaneous power to the load 166 during a startup cycle of the system 100 and during conversion delays of the fuel-based energy converters 104. This means that a load 166 connected to the system 100 will have instantaneous power, and will not have to wait for the conversion delay of the fuel-based energy converters 104 before receiving electric power.

In one embodiment, the one or more electric energy storage devices 130 are coupled to the fuel-based energy converters 104 in a parallel configuration, and act to level the load 166 on the fuel-based energy converters 104 so that the fuel-based energy converters 104 can operate at their most efficient power level without constantly varying their output based on the load 166. The electric energy storage devices 130 will supplement the power generated by the fuel-based energy converters 104 during a spike in the electric power drawn by the load 166 and during conversion delays after startup or a change in power demands. The electric energy storage devices 130 may be selected from a group consisting of batteries, such as sealed lead acid batteries, lithium ion (Li-ion) batteries, nickel metal hydride (NiMH) batteries, or a variety of rechargeable batteries, a capacitor, a super capacitor, an ultra capacitor, and other devices capable of storing electric energy. In one embodiment, the electric energy storage devices 130 are selected for use with energy capacities that may be larger than are necessary to supplement the fuel-based energy converters 104 in order to avoid deep cycling of the electric energy storage devices 130, and to increase the life of the electric energy storage devices 130. In another embodiment, the non-fuel-based energy converters 102 are also electrically coupled to the fuel-based energy converters 104 and the one or more electric energy storage devices 130 instead of providing electric power to the fuel-based energy sources 118, 122.

In one embodiment, the non-fuel-based energy converters 102, the fuel-based energy converters 104, and the electric energy storage devices 130 are each electrically coupled to a power/energy interface 158. In a further embodiment, the non-fuel-based energy converters 102, the fuel-based energy converters 104, and the electric energy storage devices 130 may also be removably coupled to the power/energy interface 158 using one or more pluggable connectors. The power/energy interface 158, in one embodiment, comprises one or more converter ports 160, one or more electric storage ports 162, and a power output port 164. In one embodiment, the one or more converter ports 160 and/or the electric storage port 162 have a standardized communications and power transfer interface. In addition, the non-fuel-based energy converters 102, the fuel-based energy converters 104, and/or the electric energy storage devices 130 each are configured to implement the standardized communications and power transfer interface. In one embodiment, the standardized communications and power transfer interface may be integrated with a mechanical connector, as described above with regard to the one or more non-fuel-based energy converters 102 and the one or more fuel-based energy converters 104, and may removably couple a corresponding pluggable connector to the power interface.

A standardized communications and power transfer port and pluggable connector interface for different types of non-fuel-based energy converters 102, fuel-based energy converters 104, and/or electric energy storage devices 130 provides the system 100 with a modular, customizable architecture, and allows additional converter and/or energy storage types to be added or removed from the system 100. The modular, customizable architecture also allows the system 100 to scale, from small portable systems to large residential or commercial systems, and allows end users to connect components without jeopardizing the system 100.

The communications interfaces of the one or more converter ports 160 and/or the electric storage port 162, in one embodiment, allow the electrical and control system 106 to receive signals from sensors 116, 126, 127, 131, and/or to receive converter type information. Converter type information identifies the specific type of energy converter and/or energy storage that is connected to the one or more converter ports 160 and/or the electric storage port 162. Examples of converter type information include a converter type identifier, an energy converter type definition identifier, an energy converter type definition, or the like. Energy converter type definitions are described in greater detail below with regard to the controller 154.

The power transfer interfaces of the one or more converter ports 160 and/or the electric storage port 162, in one embodiment, allow the transfer of electric power to the power/energy interface 158, and through the power output port 164 to the rest of the electrical and control system 106. In one embodiment, the power/energy interface 158 comprises one or more switches or other electric routing/converting means such as transistors, diodes, relays, converters such as the direct current (DC) to DC converter 132 described below, and the like, that may be controllable by a controller 154 to balance, route, convert, and otherwise manage the electric power received from the non-fuel-based energy converters 102, the fuel-based energy converters 104, and/or the electric energy storage devices 130. In one embodiment, one or more of the non-fuel-based energy converters 102 and/or the fuel-based energy converters 104 generate alternating current (AC) electric power, and one or more of the converter ports 160 are configure to receive AC electric power. For example, turbine based energy converters, such as the wind turbines 114, may be more efficient at generating AC electric power.

In another embodiment, the electric energy storage devices 130 comprise a capacitor coupled directly to the fuel-based energy converters 104 in a parallel configuration, and a battery or other energy storage device 130 coupled indirectly to the fuel-based energy converters 104 in parallel after a DC to DC converter 132 or other electrical device. In one embodiment, the electrical and control system 106 is coupled for electric power and control signal communication with the sensors, valves, and other components of the system 100. In one embodiment, the electrical and control system 106 may comprise one or more voltage and current sensors 131, a DC to DC converter 132, a circuit breaker 134, a ground fault circuit interrupter (GFCI) device 136, an electronic switch 138, a DC outlet 140, an AC inverter 142, an AC outlet 144, a circuit breaker switch 146, a GFCI switch 148, a display 150, a keypad 152, a controller 154, and a computer communication interface 156.

In one embodiment, the voltage and current sensors 131 are configured to measure at least one of the voltage and the current at both poles of the electric energy storage devices 130. The electrical and control system 106 may use the voltages and/or the currents at the poles of the electric energy storage devices 130 to determine the charge level/power level of the electric energy storage devices 130. Based on the measurements of the voltage and current sensors 131 the electrical and control system 106 determines whether to charge the electric energy storage devices 130 or to draw on the electric energy storage devices 130 to supplement or proxy for the fuel-based energy converters 104 and/or the non-fuel-based energy converters 102. The electrical and control system 106 may also provide the power status of the electric energy storage devices 130 to a user.

In one embodiment, the DC to DC converter 132 is configured to convert the variable voltage of DC generating members of the fuel-based energy converters 104 circuit and/or the non-fuel-based energy converters 102 to a substantially constant voltage. The electric power from AC generating members of the fuel-based energy converters 104 circuit and/or the non-fuel-based energy converters 102, in one embodiment, bypasses the DC to DC converter 132. In one embodiment, the substantially constant voltage is a standard voltage, such as 5 Volts, 9 Volts, 12 Volts, 14 Volts, 24 Volts and the like. In one embodiment, the DC to DC converter 132 is a switching converter, such as a buck, boost, buck-boost, inverting, forward, flyback, push-pull, half bridge, full bridge, Cuk, or SEPIC DC to DC converter. In a further embodiment, the DC to DC converter 132 comprises a voltage regulator. In general, use of a switching DC to DC converter results in less power loss than a voltage regulator DC to DC converter. The DC to DC converter 132 may provide electric power to the electrical components of the system 100 and to an electric load 166 that is coupled to the system 100. In a further embodiment, the DC to DC converter 132 is integrated with the power/energy interface 158.

In one embodiment, the circuit breaker 134 interrupts the electric circuit in response to an electrical overload or an electrical short in the circuit. An overload in the circuit may occur if the electric load 166 requires more current than the system 100 can provide. In one embodiment, the rating of the circuit breaker 134 is determined by the electric power generating capabilities of the system 100. In one embodiment, the circuit breaker 134 is a standard rated circuit breaker rated for the current level of the electrical and control system 106. In one embodiment, the circuit breaker switch 146 is configured to reset the circuit breaker 134 after the circuit breaker 134 interrupts the circuit.

In one embodiment, the GFCI device 136 interrupts the electric circuit in response to an electrical leak in the circuit. The GFCI device 136 can interrupt the electric circuit more quickly than the circuit breaker 134. The GFCI device 136 is configured to detect a difference in the amount of current entering the circuit and the amount of current exiting the circuit, indicating a current leak, or a separate path to ground. In one embodiment, the GFCI device 136 is able to sense a current mismatch as small as 4 or 5 milliamps, and can react as quickly as one-thirtieth of a second to the current mismatch. In one embodiment, the GFCI switch 148 is configured to reset the GFCI device 136 after the GFCI device 136 interrupts the circuit.

In one embodiment, the electronic switch 138 disconnects the load 166 from electric power, without disconnecting the rest of the circuit. In one embodiment, the electronic switch 138 disconnects the load 166 after a user initiates a power down phase of the system. During a shutdown state, the system 100 may activate the electronic switch 138 and disconnect the load 166, continue to generate electricity to charge the electric energy storage device 130 and to use excess fuel generated by the fuel-based energy sources 118, 122.

In one embodiment, the DC outlet 140 provides one or more outlet or plug interfaces for supplying DC power to DC devices. In one embodiment, the DC power has a standard DC voltage. In one embodiment, the standard DC voltage is about 9 to 15 Volts DC. In a further embodiment, the DC outlet 140 is a "cigarette lighter" type plug, similar to the DC outlets found in many automobiles.

In one embodiment, the AC inverter 142 converts DC power from the DC to DC converter 136 to AC power. In one embodiment, the AC inverter 142 converts the DC power to AC power having a standard AC voltage. The standard AC voltage may be chosen based on region, or the intended use of the system 100. In one embodiment, the standard AC voltage is about 110 to 120 Volts. In another embodiment, the standard AC voltage is about 220 to 240 Volts. In one embodiment, the AC inverter 142 converts the DC power to AC power having a standard frequency, such as 50 Hz or 60 Hz. The standard frequency may also be selected based on region, or by intended use, such as 16.7 Hz or 400 Hz.

In one embodiment, the AC outlet 144 provides one or more outlet or plug interfaces for supplying AC power from the AC inverter 142 to AC devices. In one embodiment, the AC outlet 144 is configured as a standard AC outlet according to a geographical region. The AC outlet 144 may also comprise multiple AC outlets, or a system of AC outlets disposed throughout a room or a building.

In one embodiment, the display 150 is configured to communicate information to a user. The display 150 may be a liquid crystal display (LCD), a light emitting diode (LED) display, an organic LED (OLED) display, a cathode ray tube (CRT) display, or another display means capable of signaling a user. In one embodiment, the display 150 is configured to communicate error messages to a user. In a further embodiment, the display 150 is configured to communicate the amount of energy stored by the electric energy storage devices 130 to a user. In another embodiment, the display 150 is configured to communicate the usage status of the fuel-based energy sources 118, 122 to a user.

In one embodiment, the keypad 152 is configured to receive input from a user. In one embodiment, the user is a technician, and the keypad 152 is configured to facilitate system error diagnosis or troubleshooting by the technician. The input may be configured to signal the system 100 to begin a start up or shut down phase, to navigate messages, options, or menus displayed on the display 150, to signal the selection of a menu item by the user, or to communicate error, troubleshooting, or other information to the system 100. The keypad 152 may comprise one or more keys, numeric keypad, buttons, click-wheels, and the like.

In one embodiment, the controller 154 is configured to control one or more components of the system 100. The controller 154 is discussed in greater detail with regards to FIG. 2 and FIG. 3. In general, the controller 106 monitors communication signals from the sensors 116, 126, 127, 131, balances the supply of electric power delivered to the electric load 166 between the electric power generated by the one or more fuel-based energy converters 104 and the electric energy stored by the one or more electric energy storage devices 130 such that the supply of electric power substantially satisfies the electric load 166, and controls the one or more converter subsystems 128 such that one or more of the communication signals from the sensors 116, 126, 127, 131 satisfy one or more predefined threshold values. The controller 154 may be an integrated circuit such as a micro-processor, an application specific integrated circuit (ASIC), a field programmable gate array (FPGA), an embedded controller, or the like and related control circuitry. The controller 154 communicates with the non-fuel-based energy converter sensors 116, the fuel-based energy source sensors 126, the fuel-based energy converter sensors 127, the converter subsystems 128, the electrical sensors 131, the display 150, the keypad 152, the power/energy interface 158, and/or other components of the system 100.

In one embodiment, the controller 154 uses a control bus to communicate with various components of the system 100. The control bus may be one or more wires, or another communications medium providing control commands and data in series or parallel. The controller 154 may communicate on the bus using digital or analog communications. The controller 154 may monitor and optimize system efficiency and system safety, as discussed below with regards to FIG. 2 and FIG. 3. In one embodiment, the controller 154 may store one or more system status messages, performance data, or statistics in a log that may be accessed by a user using the display 152 or the computer communication interface 156. In one embodiment, the controller 154 and other circuitry are positioned to prevent shorts and fire due to water within the system 100. For example, in one embodiment, the controller 154 and other circuitry are position towards the top of the system 100.

In one embodiment, the controller 154 is further configured to receive a customized energy converter type definition. The controller 154, in a further embodiment, uses information from the customized energy converter type definition to control an energy converter corresponding to the customized energy converter type definition. The energy converter corresponding to the customized energy converter type definition may be similar to of the non-fuel-based energy converters 102, one of the fuel-based energy converters 104, or may be a different or new energy converter type.

A customized energy converter type definition, in one embodiment, defines a type of energy converter for the controller 154, such that the system 100 is customizable, updatable, and upgradeable. For example, the system 100 may comprise one or more default energy converter type definitions such that the electrical and control system 106 may control members of a set of default energy converter types when they are coupled to the one or more converter ports 160. A manufacturer, user, technician, installer, or the like may define one or more customized energy converter types, enabling the electrical and control system 106 to control additional energy converter types when they are coupled to the one or more converter ports 160.

Energy converter type definitions, in one embodiment, may comprise priority information, communication signal/sensor information, converter default settings or information, currents, voltages, power levels, energy levels, or other information enabling the controller 154 to communicate with and to control an energy converter or energy storage corresponding to the energy converter type definition. In one embodiment, the controller 154 is configured to determine a type of energy converter that is plugged into one of the converter ports 160 based on signals from the energy converter and an energy converter type definition. In one embodiment, the controller 154 may receive customized energy converter type definitions from the computer communication interface 156, over the system bus described above, from another module, system, or device, or through another communications interface.

In one embodiment, the computer communication interface 156 is configured to interface the controller 154 with a computer or other electronic device. The computer communication interface 156 may comprise one or more ports, terminals, adapters, sockets, or plugs, such as a serial port, an Ethernet port, a universal serial bus (USB) port, or other communication port. In one embodiment, a computer may use the computer communication interface 156 to access system logs, performance data, system status, to change system settings, or to program the controller 154.

Figure 2:
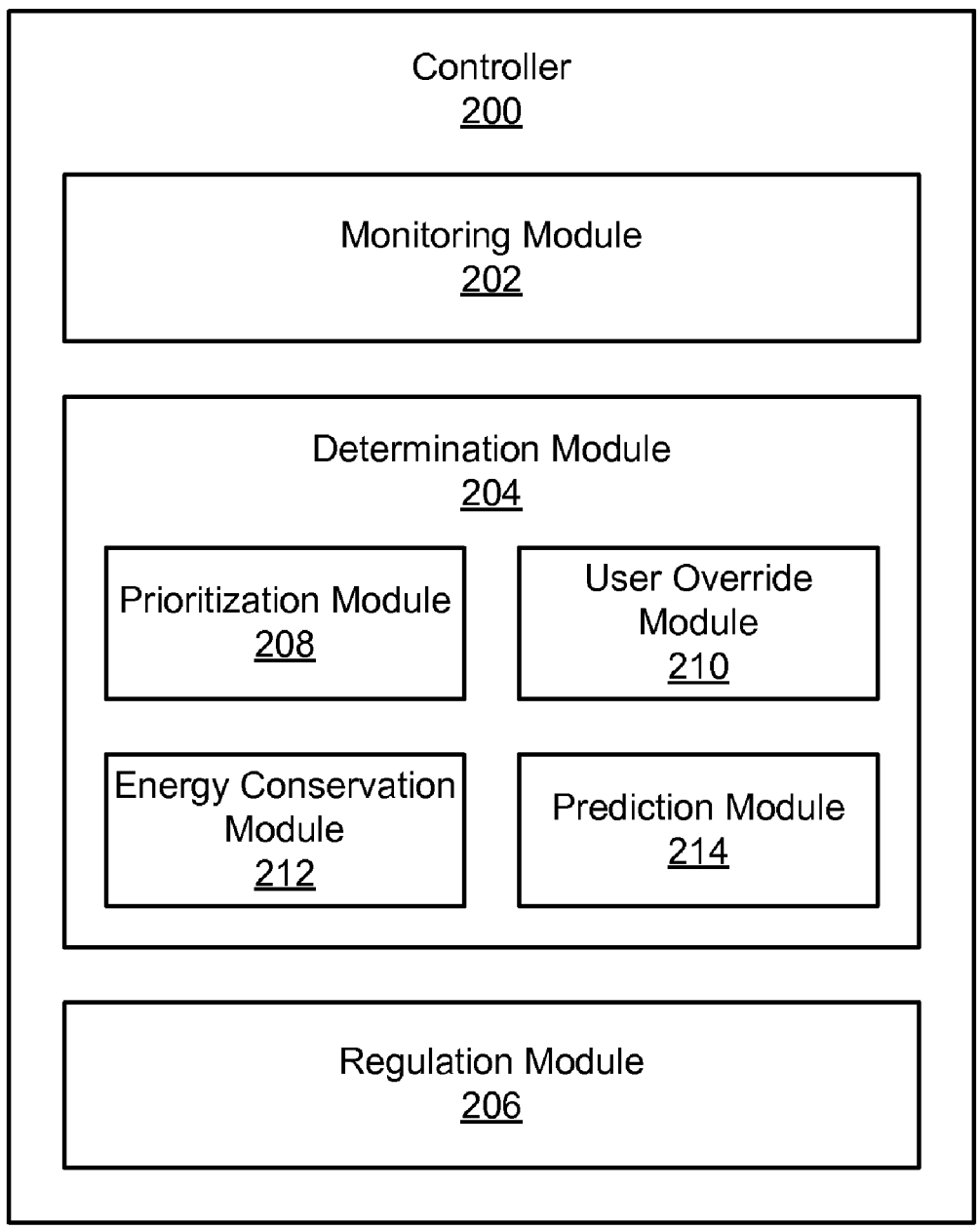
FIG. 2 is a schematic block diagram illustrating one embodiment of a controller in accordance with the present invention.

FIG. 2 depicts one embodiment of a controller 200. In one embodiment, the controller is substantially similar to the controller 154 of FIG. 1. The controller 200 may comprise a monitoring module 202, a determination module 204, and a regulation module 206.

In one embodiment, the monitoring module 202 receives communication signals from the energy source sensors 126, the energy converter sensors 116, 127, and/or the electrical sensors 131. As discussed above, the communication signals may comprise readings from the sensors 116, 126, 127, 131 such as pressures, temperatures, voltages, currents, speeds, and the like that comprise power level information of the non-fuel-based energy converters 102, the fuel-based energy converters 104, the electric energy storage devices 130, and/or the electric load 166 coupled to the system 100. The communication signals, in another embodiment, may further comprise a state of fill status of an energy source, a secondary to primary fuel conversion state of an energy converter, an electrical generation state of an energy converter, an electrical state of a energy storage device, and the like.

In another embodiment, the communication signals may comprise safety information, such as fuel leak detection, electrical over-current data or electrical under-current data, and the like. In one embodiment, each of the sensors 116, 126, 127, 131 are coupled to various microcontrollers. The microcontrollers may communicate with the monitoring module 202 over a control bus such as a serial peripheral interface (SPI) bus.

In one embodiment, the determination module 204 compares the communication signals to determine whether electric power from the non-fuel-based energy converters 102 and/or the fuel-based energy converters 104 satisfies the electric load 166. In a further embodiment, the determination module 204 further determines whether a power level of the electric energy storage devices 130 satisfies a predefined threshold level. The determination module 204 may balance the supply of electric power delivered to the electric load 166 between the electric power generated by the one or more non-fuel-based energy converters 102, the one or more fuel-based energy converters 104, and/or the electric energy stored by the electric energy storage devices 130. The determination module 204 may also balance electric power from other sources, such as municipal power. The determination module 204 may balance the supply of electric power based on the communication signals that the monitoring module 202 receives, the electric power demands of an electric load 166, and/or a prioritization of the energy converters 102, 104 and/or the electric energy storage devices 130.

In one embodiment, the determination module 204 manages the production of power/energy between the non-fuel-based energy converters 102, the fuel-based energy converters 104, and one or more alternate energy storage devices 119. Those of skill in the art recognize that a alternate energy storage device 119 may comprise a chemical device such as a battery, a supply of hydrogen, a chemical hydride, a combustible liquid fuel, heat storage, steam, a spring or winding, a vertically displaced water tank, and the like.

The determination module 204 in one embodiment uses data from one or more energy source sensors 126 as a determining factor that controls whether to change the operating speed of one or more fuel-based converters 120, 124, one or more converter subsystems 128, or to conserve or draw power/energy from one or more of the energy storage devices 103.

By way of example, suppose an example system 100 includes a fuel-based energy converter 102 such as a fuel cell system 120. The example system 100 may include a converter subsystem 128 such as a system that converts a chemical hydride to hydrogen by adding a controllable amount of water. The example system 100 may include one or more electric energy storage devices 130 such as lithium ion batteries. The controller 104 reviews the data from the energy source sensors 126 and the energy converter sensors 127 and the electric load 166. In this example, the determination module 204 may determine from input from a hydrogen pressure sensor that the converter subsystem 128 is producing more hydrogen than is currently needed to get the desired electrical output from the fuel cell system 120 and/or more hydrogen than is needed to satisfy the electrical load 166. This may be indicated by the hydrogen pressure exceeding a certain threshold. The thresholds that are set may be set to account for certain conversion delays of the different components of the system. The determination module 204, in another embodiment, may make such a determination based on a current and/or a voltage or other power/energy level information from the energy converter sensors 116, 127.

Consequently, the determination module 204 may increase the electricity production rate of the fuel cell system 120 in order to use the increased hydrogen. In addition, the determination module 204 may divert electricity produced by the fuel cell system 120 to the one or more electric energy storage devices 130. In addition, if the electric energy storage devices 130 are already sufficiently charged, the determination module 204 may divert the hydrogen produced by the converter subsystem 128 to a hydrogen storage device 119 (i.e. a hydrogen storage tank), for example by opening a valve between the subsystem converter 128 and the hydrogen storage tank 119 and/or activating a pump to move the excess hydrogen into the hydrogen storage tank 119. In addition the determination module 204 may reduce the amount of water being pumped into a chemical hydride converter subsystem 128 to reduce the amount of hydrogen being produced, or divert extra electric power generated by the fuel cell system 120 to the generation of hydrogen or other fuel or potential energy for storage in the alternate energy storage device 119.

In this manner, the non-fuel-based energy sources, primary fuel sources, secondary fuel sources, and other tertiary fuel sources, the converter subsystems 128, and the electric energy storage devices 130 are used as efficiently as possible. In light of this specification, one of skill in the art will appreciate that the operations of the determination module 204, with respect to the example system above, can be applied in the case where more power is needed to meet the load 166. Similarly, those of skill in the art, in light of this specification, will appreciate how to apply the concept of adjusting inputs and outputs of the non-fuel-based energy sources, primary fuel sources, secondary fuel sources, and other tertiary fuel sources, converter subsystem 128, and electric energy storage devices 130 in response to associated one or more energy source sensors 126 and one or more energy converter sensors 127.

In one embodiment, the electric energy storage devices 130 have a storage capacity that is capable of substantially satisfying a power draw of the electric load 166 for at least twelve hours. With such a storage capacity, the non-fuel-based energy converters 102 and/or the fuel-based energy converters 104 may be configured to output an amount of electric power that satisfies an average power draw of the electric load 166, but may be less than an amount required to satisfy a peak power draw of the electric load 166. This increases the overall efficiency of the system 100 and lowers the overall cost of the system 100.

The determination module 204 may balance the supply of electric power actively or passively. For example, each of the fuel-based energy converters 104 and the electric energy storage devices 130 may be electrically coupled in a parallel configuration, such that the determination module 204 passively balances the electric power delivered to the electric load 166 between them by controlling how much electric power is generated. The determination module 204 may balance the electric power by draining the electric energy storage devices 130 under high loads and during conversion delays, and charging the electric energy storage devices 130 under low loads. In one embodiment, the determination module 204 balances the supply of electric power actively by manipulating switches, converters, and the like within the power/energy interface 158.

The determination module 204 may control the electrical power provided by the fuel-based energy converters 104 by controlling the converter subsystems 128. For example, with a chemical hydride converter subsystem 128, the determination module 204 may adjust the rate at which water is added to the chemical hydride. Based on the requirement of the electrical load 166, the internal consumption of the system 100, and the electric energy storage device 130 charge level/power level status, the determination module 204 determines and controls how much power will be delivered from the fuel-based energy converters 104 so that the (long-term) power requirements from the load 166 and the internal system consumption will be met and the desirable threshold electric energy storage device 130 charge level will be maintained.

In another embodiment, the determination module 204 may use device switching to balance the electric power delivered to the electric load 166 based on the communication signals from the energy source sensors 126, the energy converter sensors 116, 127, and the electrical sensors 131. The determination module 204 may balance the electric power by sending control signals to one or more switches coupled electrically to one or more fuel-based energy converters, non-fuel-based energy converters, and/or energy storage devices. The switches, in one embodiment, are disposed within the power/energy interface 158, as described above. In one embodiment, the control signals are pulse width modulated (PWM) signals, and the switches are PWM controlled metal oxide semiconductor field effect transistors (MOSFETs).

In another embodiment, the electric energy storage device 130 is directly connected with the output of the DC-DC 132, so that a short-term high power requirement from the load 166 can be satisfied instantaneously and the system 100 can provide the much higher power output to the load 166 than one or more fuel-based energy converters 104 can provide operating at maximum capacity. The DC-DC converter 132 draws power from the non-fuel-based energy converters 102 and/or the fuel-based energy converters 104 at a controlled rate so that the electrical power generation is optimized and not interrupted.

In another embodiment, the determination module 204 further comprises a prioritization module 208 that may balance the electric power based on a prioritization of the energy converters 102, 104 and/or the electric energy storage devices 130. The prioritization may be an economic prioritization, an energy conversion cost prioritization, an energy conversion efficiency prioritization, an environmental prioritization, an energy conversion delay prioritization, a remaining fuel prioritization, a safety prioritization, a combination of these prioritizations, and the like. The prioritization may be static, dynamic, based on user input, or based on readings from the sensors 116, 126, 127, 131. The prioritization may be based on one or more mathematical or statistical curves. The prioritization module 208 may balance the electric power by increasing the electric power sourced from a lower priority converter or device in response to a decrease in electrical output by a higher priority converter or device, a conversion delay of a higher priority converter or device, an increase in electric power demands from the load 166, or the like. In one embodiment, the prioritization module 208 disconnects the system 100 from the electric load 166 when the electric load 166 exceeds the electric power that the system 100 is capable of producing.

In one embodiment, in the prioritization of electric sources, a priority of the non-fuel-based energy converters 102 is higher than a priority of the electric energy storage devices 130, and the priority of the electric energy storage devices 130 is higher than a priority of the fuel-based energy converters 104. For example, the prioritization of electric sources may comprise the non-fuel-based energy converters 102 having a high priority, the electric energy storage devices 130 having a medium priority, and the fuel-based energy converters 104 having a low priority. Under this prioritization scheme, the prioritization module 208 delivers electric power to the load 166 first from the non-fuel-based energy converters 102 such that this uncontrollable source of power is not wasted. If the electric power delivered by the non-fuel-based energy converters 102 does not satisfy the electric load 166, the prioritization module 208 delivers electric power from the electric energy storage devices 130 to the electric load 166. If the electric load 166 has a higher draw than the non-fuel-based energy converters 102 and the energy storage devices 130 can provide, the prioritization module 208 may deliver electric power from the fuel-based energy converters 104 either to the electric load 166, or to the electric energy storage devices 130 to recharge them such that they satisfy the electric load 166.

In one embodiment, the determination module 204 comprises a user override module 210. The user override module 210, in one embodiment, overrides the prioritization of electric sources of the prioritization module 208 based on user input. The user input may come from the keypad 152, the computer communication interface 156, directly from the non-fuel-based energy converters 102, the fuel-based energy converters 104, and/or the electric energy storage devices 130 over the energy interface ports 160, 162, or from another source.

In one embodiment, the determination module 204 comprises an energy conservation module 212. The energy conservation module 212, in one embodiment, stores excess electric power from the non-fuel-based energy converters 102 and/or from the fuel-based energy converters 104 as an alternate energy type. As discussed above, the alternate energy type may be stored in the alternate energy storage device 119. The energy conservation module 212 may store excess electric power as an alternate energy type in response to a determination by the determination module 204 that the electric power from the non-fuel-based energy converters 102 and/or from the fuel-based energy converters 104 satisfies the electric load 166, and that the power level of the electric energy storage devices 130 satisfies a predefined threshold level.

The energy conservation module 212 may cause one or more of the fuel-based energy converters 104 to convert the excess electric power to an alternative energy type such as a fuel, heat energy, chemical energy, or potential energy. For example, the fuel-based energy converters 104 may use the excess electric power to convert water to hydrogen using electrolysis, storing the hydrogen in the alternate energy storage device 119. In another example, the fuel-based energy converters 104 may use the excess electric power to heat water, using the heated water and/or steam at a later time to produce electric power using a microturbine, waste heat cogeneration, in conjunction with concentrators/collectors, to facilitate a hydrogen producing reaction, or otherwise. In a further example, the fuel-based energy converters 104 and/or the non-fuel-based energy converters 104 may use the excess electric power to wind or compress a spring, to pump a liquid/lift an object to a higher location, or to otherwise store potential energy that can be later converted to electric power.

In one embodiment, the determination module 204 comprises a prediction module 214. The prediction module 214, in one embodiment, makes a prediction regarding an upcoming power draw of the electric load 166 based on a previous or historic power draw of the electric load 166. For example, power usage patterns may be tracked and used to predict time periods in which the load will be over a selected level. The prediction module 214 may, in one embodiment, adjust the electric power and/or the fuel generation from the fuel-based energy converters 104 based on the prediction. In a further embodiment, the prediction module 214 may be configured to similarly predict the output power level of the non-fuel-based energy converters 102 based on a previous or historic output power level. For example, wind powered converters 104 may produce more power at different times of the day or days of the year. The prediction module 214 may thus detect patterns in the electric load 166 and/or in the non-fuel-based energy converters 102. Examples of patterns include running an appliance or device at a certain time daily, a decrease in an electric power level from a photovoltaic cell 110 at sunset and a corresponding increase in the electric power level at sunrise, or other regular patterns.

In one embodiment, the regulation module 206 controls the energy converters 104 using one or more control signals such that the communication signals from the sensors 116, 126, 127, 131 that the monitoring module 202 receive satisfy one or more predefined threshold values. The regulation module 206 may use the control signals to adjust the electric power output from the fuel-based energy converters 104 in response to a determination by the determination module 204 that the electric power from the one or more energy converters does not satisfy an electric load threshold for the electric load 166 and/or that the power level of the electric energy storage devices 130 does not satisfy a predefined threshold level.

The regulation module 206 may adjust the electric power output either up or down (increased or decreased) depending on how the electric power output compares to the current electric load 166 or to a predicted electric load. To increase the electric power output, the regulation module 206 may signal the fuel-based energy converters 104 to operate at higher output in order to produce more electric power per minute. The meaning of "higher output" will vary depending on the type of fuel-based energy converter 104, for example, for an internal combustion engine increasing the power output may be accomplished by increasing the RPMS of the engine, for a fuelcell energy converter 104 engine increasing the power output may be accomplished by increasing the flow rate of Hydrogen delivered to the fuelcell. Those of skill in the art will recognize first that certain fuel-based energy converters 104 may or may not have a capability of increasing or decreasing the electric power output and that the factors for increasing or decreasing the electric power output will vary between fuel-based energy converters 104. For the purposes of this description, the regulation module 206 is configured to account for these variations and signal the fuel-based energy converters 104 accordingly to adjust the electric power output.

Similarly, to decrease the electric power output, the regulation module 206 may signal the fuel-based energy converters 104 to operate at lower speeds or flow rates or even take certain fuel-based energy converters 104 off-line (i.e. a complete shutdown) in order to produce less electric power per minute. The electric load threshold defines an electric power output that triggers the regulation module 206 to make an adjustment to the electric power output, either increased or decreased. The electric load threshold may comprise a value that is equal to the value of the electric load 166 or less than the value of the electric load 166. Alternatively, or in addition, the electric load threshold may comprise a percentage of the value of the electric load 166.

The regulation module 206, in one embodiment, may send the control signals to the converter subsystems 128. The control signals may be PWM signals to MOSFETs or other control signals to the converter subsystems 128. In one embodiment, the converter subsystems 128 may increase or decrease primary fuel production by the fuel-based energy converters 120, 124 in response to the control signals from the regulation module 206. In another embodiment, the converter subsystems 128 may increase or decrease electric power generation by the fuel-based energy converters 120, 124 in response to the control signals from the regulation module 206. In a further embodiment, the converter subsystems 128 may increase a primary or secondary fuel output from the fuel-based energy sources 118, 122 in response to the control signals from the regulation module 206.

In one embodiment, the converter subsystem 128 may respond with a change in pump speed, an adjustment to a cooling system, opening or closing a valve, or another converter subsystem 128 adjustment. For example, the regulation module 206 may send a control signal to a converter subsystem 128 that is configured to increase water pumped into a chemical hydride, increase electric power delivered to an electrolysis system, or increase a hydrogen flow from a hydrogen tank in response to a hydrogen pressure reading from one of the energy converter sensors 127 to the monitoring module 202 that is at or below a predefined "low pressure" threshold.

The threshold values may be target fuel source pressures for the fuel-based energy converters 120, 124, safe converter temperatures for the fuel-based energy converters 120, 124, target electric power outputs for the fuel-based energy converters 120, 124, target energy storage amounts for the electric energy storage devices 130, and the like. In one embodiment, the threshold values reflect the converter prioritizations. The threshold values may be static, or may be dynamic and based on the electric power load 166, the charge status of the electric energy storage devices 130, and the like. In one embodiment the threshold values comprise mathematical or statistical curves that coordinate states, speeds, rates, and the like of the converter subsystems 128 with electric power demands, or with threshold values for the sensors 116, 126, 127, 131.

In one embodiment, the threshold value of the electric energy storage devices 130 may be based on an power conversion delay of the fuel-based energy converters 104. For example, if the fuel-based energy converters 104 have a ten minute energy conversion delay, the threshold value of the electric energy storage devices 130 may be calculated or determined such that the electric energy storage devices 130 still have enough electric power when the threshold value is met to satisfy the electric load 166 for at least one or more minutes. For example, the threshold may be set at sixty percent, knowing that the power level of the electric energy storage devices 130 may fall to fifty percent or lower before the fuel-based energy converters 104 begin to recharge them.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
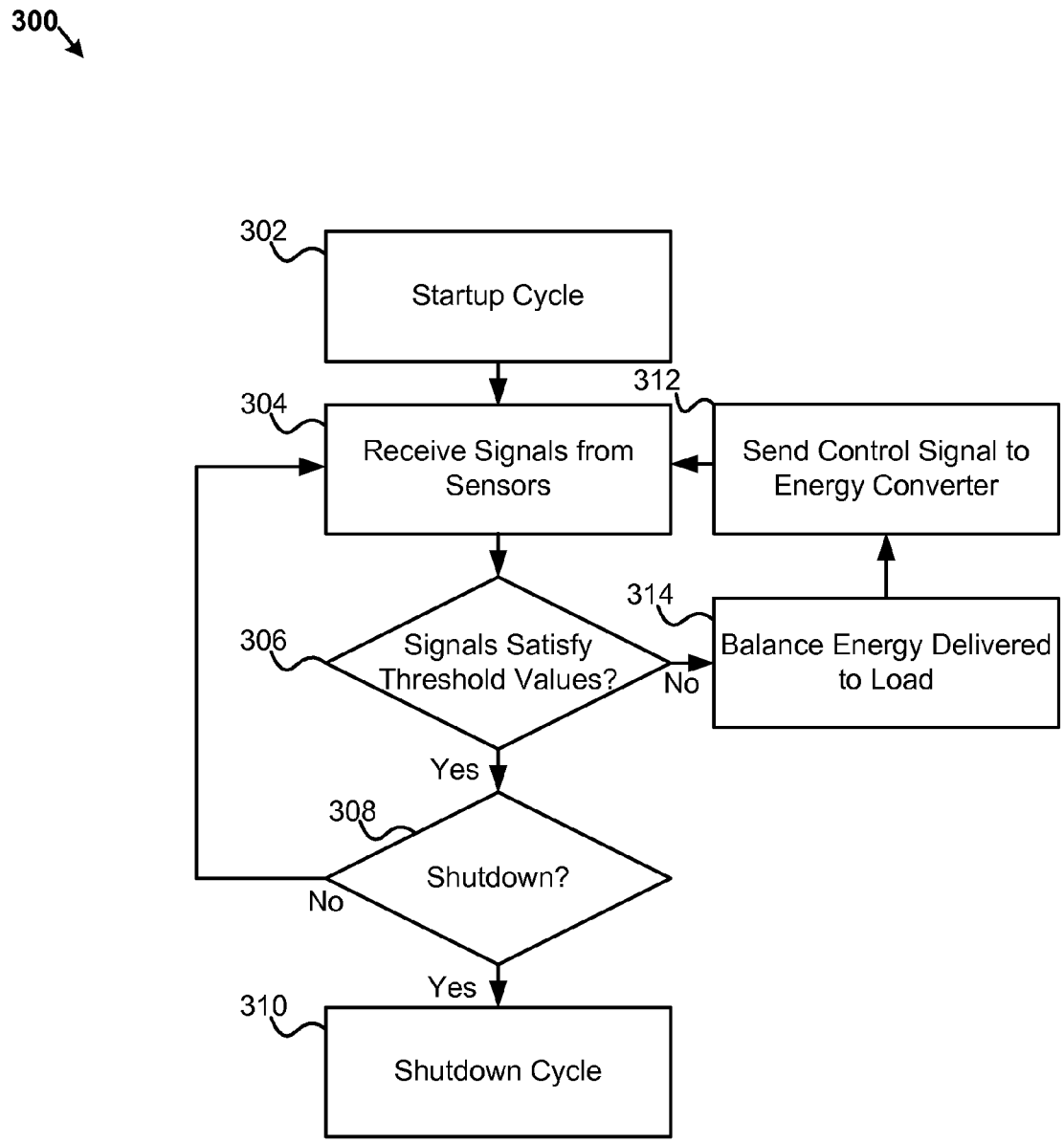
FIG. 3 is a flow chart diagram illustrating one embodiment of a method for managing the generation and use of hybrid electric power in accordance with the present invention.

FIG. 3 illustrates a method 300 for managing the generation and use of electric power. In one embodiment, the system 100 executes 302 a startup cycle. The system 100 may startup 302 in response to a user input such as a button press, a switch flip, another user input, or in response to a timer or other state change. Executing 302 the startup cycle may comprise executing one or more self tests, including testing the charge state of the one or more electric energy storage devices 130, the state of fill of the one or more fuel-based energy sources 118, 122, readings from the energy source sensors 126, the energy converter sensors 116, 127, and the electrical sensors 131 and the like. In another embodiment, executing 302 the startup cycle may comprise executing one of multiple possible startup cycles, such as a normal startup cycle, a quick startup cycle, and the like. The determination module 204 may balance the electric power delivered to a load 166 during the execution 302 of the startup cycle such that the electric power satisfies the power demands of the load 166 during the conversion delays of the one or more fuel-based power converters 104.

In one embodiment, the monitoring module 202 receives 304 communication signals from one or more of the sensors 116, 126, 127, 131. The determination module 204 determines 306 whether the communication signals satisfy one or more threshold values. The determination module 204 may also calculate dynamic threshold values.

If the determination module 204 determines 306 that one or more of the communication signals do not satisfy the threshold values, the determination module 204 may balance 314 the electric power that is delivered to the load 166 between the non-fuel-based energy converters 102, the fuel-based energy converters 104, and/or the electric energy storage devices 130. The balancing 314 may be based on one or more converter prioritizations, conversion delays, electric power states, and the like. The balancing 314 may comprise increasing or decreasing the portions of electric power delivered to the load 166 from the non-fuel-based energy converters 102, the fuel-based energy converters 104, the electric energy storage devices 130, and/or other electric sources. In one embodiment, the determination module 204 may balance 314 the electric power that is delivered to the load 166 throughout the method 300.

If the determination module 204 determines 306 that one or more of the communication signals do not satisfy the threshold values, the regulation module 206 may send 312 one or more control signals to one or more of the converter subsystems 128. The one or more control signals may be configured to bring the communication signals that did not satisfy the threshold values within the threshold values, such as increasing fuel output by the fuel-based energy sources 118, 122, increasing secondary to primary fuel conversion by the fuel-based energy converters 120, 124, reducing a temperature, increasing electrical production by the fuel-based energy converters 120, 124, and the like.

If the determination module 204 determines 306 that the communication signals do satisfy the threshold values, the controller 200 determines 308 whether the system 100 has reached a shutdown state. The controller 200 may determine 308 whether to shutdown the system 100 based on a user input such as a button press, a switch flip, another user input, in response to a timer, a system error condition, a safety hazard, or another system state change. If the controller 200 determines 308 to shutdown the system 100, the system 100 executes 310 a shutdown cycle. Executing 310 the shutdown cycle may comprise one or more system purges, cool down cycles, self tests, and the like. In one embodiment, executing 310 the shutdown cycle comprises charging the one or more electric energy storage devices 130. In another embodiment, executing 310 the shutdown cycle may comprise executing one of multiple possible shutdown cycles, such as a normal shutdown cycle, a quick shutdown cycle, and the like. The determination module 204 may balance the electric power during the execution 310 of the shutdown cycle such that electric power is not delivered to the load 166, but electric power is delivered to the one or more electric energy storage devices 130. This may charge the electric energy storage devices 130 and use excess fuel from the fuel-based energy sources 118, 122 without wasting fuel.

Figure 4:
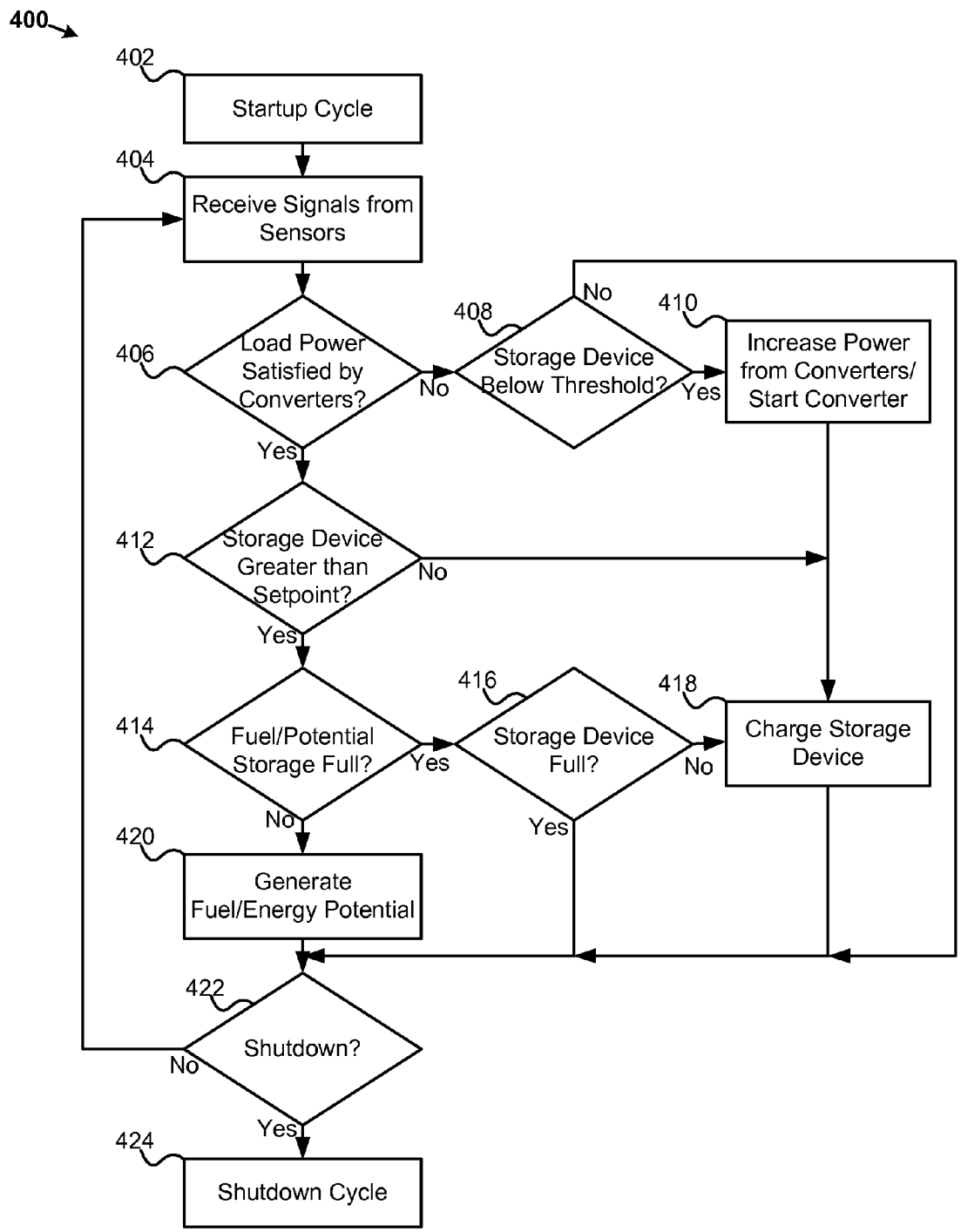
FIG. 4 is a flow chart diagram illustrating another embodiment of a method for managing the generation and use of hybrid electric power in accordance with the present invention.

FIG. 4 illustrates a method 400 for managing the generation and use of electric power. In one embodiment, the method 400 is substantially similar to the method 300 of FIG. 3 described above. In one embodiment, the system 100 executes 402 a startup cycle, as described above. In one embodiment, the monitoring module 202 receives 404 communication signals from one or more of the sensors 116, 126, 127, 131. The communication signals may comprise power levels or power level information of the non-fuel-based energy converters 102, the fuel-based energy converters 104, the electric energy storage devices 130, and/or the electric load 166.

The determination module 204 determines 406 whether electric power from the non-fuel-based energy converters 102 satisfies the electric load 166. If the determination module 204 determines 406 that the electric power from the non-fuel-based energy converters 102 does not satisfy the electric load 166, the determination module determines 408 whether a power level of the electric energy storage devices 130 is below a predefined threshold level. If the power level of the electric energy storage devices 130 is below the predefined threshold level, the regulation module 206 increases 410 the electric power from the fuel-based energy converters 104 and charges 418 the electric energy storage devices 130 and the method 400 proceeds to a shutdown determination step 422. If the determination module 204 determines 408 that the power level of the electric energy storage device 130 is not below the predefined threshold level, the method 400 proceeds to the shutdown determination step 422.

If the determination module 204 determines 406 that the electric power from the non-fuel based energy converters 102 does satisfy the electric load 166, the energy conservation module 212 determines 412 whether the electrical energy storage devices 130 have an power level that is greater than a predefined setpoint. The setpoint may comprise an optimal or target power level/charge level for the electrical energy storage devices 130. Example setpoints include, eighty percent, ninety percent, ninety-five percent, or other power levels.

If the energy conservation module 212 determines 412 that the electric energy storage devices 130 are not greater than the setpoint, the regulation module 206 charges 418 the electric energy storage devices 130 using the excess electric power generated by the non-fuel-based energy converters 102 and the method 400 proceeds to the shutdown determination step 422.

If the energy conservation module 212 determines 412 that the electric energy storage devices 130 do have an power level/charge level greater than the setpoint, the energy conservation module 212 may determine 414 whether the alternate energy storage device 119 is full. If the energy conservation module 212 determines 414 that the alternate energy storage device 119 is full, the energy conservation module 212 may determine 416 whether the electric energy storage devices 130 are full, and the regulation module 206 may charge the electric energy storage devices 130 if they are not full.

If the energy conservation module 212 determined 414 that the alternate energy storage device 119 is not full, the regulation module 206 may cause the fuel-based energy converters 104 and/or the non-fuel-based energy converters 102 to use excess electrical power to generate an alternate energy type such as a fuel and/or potential energy to store in the alternate energy storage device 119. The controller 200 determines 422 whether the system 100 has reached a shutdown state. If the controller 200 determines 422 to shutdown the system 100, the system 100 executes 424 a shutdown cycle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to manage the generation and use of electric power, the apparatus comprising:
    a monitoring module configured to receive signals from a plurality of sensors, the signals comprising power level information of a plurality of energy converters, energy level information of an electric energy storage device, and power level information of an electric load, wherein the plurality of energy converters comprises at least one fuel-based energy converter and at least one non-fuel-based energy converter, the at least one fuel-based energy converter converts a secondary fuel to a primary fuel and generates electric power using the primary fuel, the secondary fuel comprises a mixture of a solid anhydrous chemical hydride reactant and a solid anhydrous activating agent, and the primary fuel comprises hydrogen;
    a determination module configured to compare the signals to determine whether electric power from the plurality of energy converters satisfies the electric load and whether the energy level of the electric energy storage device satisfies a predefined threshold level, the predefined threshold level based on an energy conversion delay of the at least one fuel-based energy converter, the energy conversion delay comprising an amount of time for the at least one fuel-based energy converter to convert the secondary fuel to the primary fuel and to generate electric power using the primary fuel; and
    a regulation module configured to increase the electric power from the at least one fuel-based energy converter in response to a determination by the determination module that the electric power from the plurality of energy converters does not satisfy the electric load threshold and that the energy level of the electric energy storage device does not satisfy the predefined threshold level, wherein the regulation module increases the electric power from the at least one fuel-based energy converter by increasing a rate that the at least one fuel-based energy converter introduces a liquid to the mixture of the solid anhydrous chemical hydride reactant and the solid anhydrous activating agent to produce hydrogen and generates electric power using the produced hydrogen, the hydrogen produced at the time the at least one fuel-based energy converter introduces the liquid to the mixture of the solid anhydrous chemical hydride reactant and the solid anhydrous activating agent.

2. The apparatus of claim 1, further comprising an energy conservation module configured to store excess electric power from the plurality of energy converters as an alternate energy type in response to a determination by the determination module that the electric power from the plurality of energy converters satisfies the electric load.

3. The apparatus of claim 2, wherein the energy conservation module is further configured to cause at least one of the plurality of energy converters to convert a secondary conservation fuel to a primary conservation fuel, the primary fuel comprising the alternate energy type.

4. The apparatus of claim 2, wherein the alternate energy type is selected from the group consisting of hydrogen gas, heat energy, chemical energy, and potential energy.

5. The apparatus of claim 4, wherein the energy conservation module is further configured to charge the electric energy storage device in response to a substantially full alternate energy storage device.

6. The apparatus of claim 1, further comprising a prioritization module configured to balance a supply of electric power delivered to the electric load based on a prioritization of power/energy sources.

7. The apparatus of claim 6, wherein, in the prioritization of electric sources, a priority of the at least one non-fuel-based energy converter is higher than a priority of the electric energy storage device, and the priority of the electric energy storage device is higher than a priority of the at least one fuel-based energy converter.

8. The apparatus of claim 6, wherein the prioritization of electric sources is selected based on one or more of an energy conversion cost, an energy conversion efficiency, and an energy conversion delay, a user override module configured to override the prioritization of electric sources based on user input.

9. The apparatus of claim 1, further comprising a prediction module configured to make a prediction of an upcoming power draw of the electric load based on a historic power draw of the electric load, and wherein the determination module is further configured to adjust the electric power from the plurality of energy converters based on the prediction.

10. A system to manage the generation and use of electric power, the system comprising:
a plurality of energy converters each configured to convert an energy source to electric power, the plurality of energy converters comprising at least one fuel-based energy converter and at least one non-fuel-based energy converter, the at least one fuel-based energy converter converting a secondary fuel to a primary fuel and generating electric power using the primary fuel, the secondary fuel comprising a mixture of a solid anhydrous chemical hydride reactant and a solid anhydrous activating agent, and the primary fuel comprising hydrogen;
an electric energy storage device configured to store the electric power from the plurality of energy converters as energy and to supply the energy as electric power;
a plurality of sensors that measure an energy level of the electric energy storage device, a power level of the plurality of energy converters, and a power level of an electric load coupled to the plurality of energy converters and to the electric energy storage device;
a controller configured to determine whether the power level of the plurality of energy converters satisfies the electric load and whether the energy level of the electric energy storage device satisfies a predefined threshold level and to increase the power level of the at least one fuel-based energy converter in response to a determination that the power level of the plurality of energy converters does not satisfy the electric load and that the energy level of the electric energy storage device fails to satisfy the predefined threshold level, the predefined threshold level based on an energy conversion delay of the at least one fuel-based energy converter, the energy conversion delay comprising an amount of time for the at least one fuel-based energy converter to convert the secondary fuel to the primary fuel and to generate electric power using the primary fuel, wherein the controller increases the power level of the at least one fuel-based energy converter by increasing a rate that the at least one fuel-based energy converter introduces a liquid to the mixture of the solid anhydrous chemical hydride reactant and the solid anhydrous activating agent to produce hydrogen and generates electric power using the produced hydrogen, the hydrogen produced at the time the at least one fuel-based energy converter introduces the liquid to the mixture of the solid anhydrous chemical hydride reactant and the solid anhydrous activating agent; and
a power interface configured to electrically couple the plurality of sensors, the electric energy storage device, and the controller.

11. The system of claim 10, wherein the signals further comprise an energy source status and an electric power generation potential of the plurality of energy converters.

12. The system of claim 11, wherein the electric power generation potential comprises a measured gas pressure of produced hydrogen generated by the at least one fuel-based energy converter.

13. The system of claim 10, wherein at least one of the at least one non-fuel-based energy converters is selected from the group consisting of photovoltaic cells, wind turbines, water turbines, geothermal turbines, solar concentrators, and waste heat co-generators.

14. The system of claim 10, wherein the at least one fuel-based energy converter comprises a plurality of fuel-based energy converters, at least one of the plurality of fuel-based energy converters selected from the group consisting of a fuel cell, a microturbine system, a hydrogen reformer, a hydrogen electrolysis system, and an internal combustion engine generator.

15. The system of claim 10, wherein the power interface comprises one or more standardized ports, each of the standardized ports configured to transfer communication signals and electric power from a corresponding pluggable connector of one of the plurality of energy converters, and to removably couple the corresponding pluggable connector to the power interface.

16. The system of claim 10, wherein the controller is further configured to receive customized energy converter type definitions and to control energy converters corresponding to the customized energy converter type definitions.

17. The system of claim 10, wherein at least one of the plurality of energy converters comprises a collapsible structure.

18. The system of claim 10, wherein the electric energy storage device comprises an energy storage capacity configured to substantially satisfy a power draw of the electric load for at least twelve hours, and further wherein the plurality of energy converters are configured to output an amount of electric power satisfying an average power draw of the electric load and less than a peak power draw of the electric load.

19. A computer program product comprising a computer readable medium having computer usable program code executable to perform operations for managing the generation and use of electric power/energy, the operations of the computer program product comprising:
receiving signals from a plurality of sensors, the signals comprising energy level information of an electric energy storage device, power/energy level information of a plurality of energy converters, pressure level information of a hydrogen storage device, and power/energy level information of an electric load, wherein the plurality of energy converters comprises one or more hydrogen-based energy converters and one or more non-fuel-based energy converters, the one or more hydrogen-based energy converters converting a secondary fuel comprising a mixture of a solid anhydrous chemical hydride reactant and a solid anhydrous activating agent to hydrogen and generating electric power using the hydrogen;

determining whether electric power/energy from the plurality of energy converters satisfies the electric load;

determining whether an energy level of the electric energy storage device satisfies a predefined threshold level, the predefined threshold level based on an energy conversion delay of the one or more hydrogen-based energy converters, the energy conversion delay comprising an amount of time for the one or more hydrogen-based energy converters to convert the secondary fuel to hydrogen and to generate electric power using the hydrogen;

increasing a rate that the one or more hydrogen-based energy converters introduce a liquid to the mixture of the solid anhydrous chemical hydride reactant and the solid anhydrous activating agent to produce hydrogen and generate electric power using the produced hydrogen in response to a determination that the electric power/energy from the plurality of energy converters does not satisfy the electric load and that the energy level of the electric energy storage device does not satisfy the predefined threshold level, the hydrogen produced at the time the one or more hydrogen-based energy converters introduce the liquid to the mixture of the solid anhydrous chemical hydride reactant and the solid anhydrous activating agent.

20. The computer program product of claim 19, further comprising storing excess electric power/energy from the plurality of energy converters as an alternate energy type in response to a determination that the electric power/energy from the plurality of energy converters satisfies the electric load and that the energy level of the electric energy storage device satisfies the predefined threshold level, and further comprising charging the electric energy storage device in response to a full alternate energy storage device.

21. The computer program product of claim 20, further comprising charging the electric energy storage device in response to a determination that the energy level of the electric energy storage device does not satisfy the predefined threshold level.

* * * * *